United States Patent
Yang et al.

(10) Patent No.: US 8,787,194 B2
(45) Date of Patent: Jul. 22, 2014

(54) METHOD OF PERFORMING CELL MEASUREMENT AND METHOD OF PROVIDING INFORMATION FOR CELL MEASUREMENT

(75) Inventors: Yoonoh Yang, Gyeonggi-Do (KR);
Suhwan Lim, Gyeonggi-Do (KR);
Manyoung Jung, Gyeonggi-Do (KR);
Sangwook Lee, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/529,448

(22) Filed: Jun. 21, 2012

(65) Prior Publication Data
US 2013/0058234 A1 Mar. 7, 2013

Related U.S. Application Data

(60) Provisional application No. 61/531,082, filed on Sep. 5, 2011, provisional application No. 61/579,641, filed on Dec. 22, 2011.

(30) Foreign Application Priority Data

Feb. 22, 2012 (KR) .................. 10-2012-0018204

(51) Int. Cl.
*H04L 12/26* (2006.01)
*H04L 27/26* (2006.01)
*H04W 36/00* (2009.01)
*H04L 5/00* (2006.01)

(52) U.S. Cl.
CPC ......... *H04W 36/0094* (2013.01); *H04L 27/261* (2013.01); *H04L 27/2636* (2013.01); *H04L 5/001* (2013.01)
USPC ............................ 370/252; 455/445; 370/281

(58) Field of Classification Search
CPC . H04W 24/10; H04W 84/045; H04W 72/082; H04L 25/0202; H04L 27/2636
See application file for complete search history.

(56) References Cited

U.S. PATENT DOCUMENTS

| | | | |
|---|---|---|---|
| 7,808,882 B2 | 10/2010 | Imamura | |
| 2009/0046641 A1 | 2/2009 | Wang et al. | |
| 2011/0116437 A1* | 5/2011 | Chen et al. | 370/312 |
| 2011/0122823 A1 | 5/2011 | Chen | |
| 2011/0275394 A1* | 11/2011 | Song et al. | 455/509 |
| 2012/0033595 A1* | 2/2012 | Aoyama et al. | 370/311 |
| 2012/0044872 A1* | 2/2012 | Aydin et al. | 370/328 |
| 2012/0213107 A1* | 8/2012 | Jang et al. | 370/252 |
| 2012/0275322 A1* | 11/2012 | Ji et al. | 370/252 |
| 2012/0307922 A1* | 12/2012 | Simonsson et al. | 375/260 |

(Continued)

OTHER PUBLICATIONS

John, PBCH: How quickly can a UE read the MIB?, Mar. 20, 2010, LTEuniversity.com, 6 pages.*

(Continued)

*Primary Examiner* — Ayaz Sheikh
*Assistant Examiner* — Mounir Moutaouakil
(74) *Attorney, Agent, or Firm* — Birch, Stewart, Kolasch & Birch, LLP

(57) ABSTRACT

A method of providing information for cell measurement is provided. In the method, a first cell obtains a first pattern information indicating a subframe for performing measurement with respect a second cell. The first cell configures a subframe for performing measurement, which is different from that for performing measurement with respect the second cell. The first cell transmits a second pattern information on the subframe configured by the first cell to a user equipment (UE).

24 Claims, 25 Drawing Sheets

(56) References Cited

U.S. PATENT DOCUMENTS

| | | |
|---|---|---|
| 2012/0327821 A1* | 12/2012 | Lin et al. .................. 370/280 |
| 2013/0003578 A1* | 1/2013 | Hu et al. .................. 370/252 |
| 2013/0017793 A1* | 1/2013 | Henttonen et al. ........... 455/63.1 |
| 2013/0028149 A1* | 1/2013 | Chen et al. .................. 370/280 |
| 2013/0028161 A1* | 1/2013 | Maeda et al. .................. 370/311 |
| 2013/0029657 A1* | 1/2013 | Gao et al. .................. 455/422.1 |
| 2013/0045740 A1* | 2/2013 | Gayde et al. .................. 455/436 |
| 2013/0045770 A1* | 2/2013 | Aschan et al. .................. 455/522 |

OTHER PUBLICATIONS

Lindbom et al, enhanced inter-cell interference coordination for heterogenous networks in LTE-Adavanced: a survey, Dec. 7, 2011, 18 pages, texas instrument.*

Peter Wang, LTE phisycal-layer overview, Jan. 16, 2011, 36 pages.*

* cited by examiner

Single component carrier (e.g. LTE system)

(a)

(b)

(a)

(b)

METHOD OF PERFORMING CELL
MEASUREMENT AND METHOD OF
PROVIDING INFORMATION FOR CELL
MEASUREMENT

CROSS-REFERENCE TO RELATED APPLICATION

Pursuant to 35 U.S.C. §119(a), this application claims the benefit of U.S. Provisional Applications No. 61/531,082 filed on Sep. 5, 2011, and No. 61/579,641 filed on Dec. 22, 2011, and the benefit of earlier filing date and right of priority to Korean Application No. 10-2012-0018204, filed on Feb. 22, 2012. The contents of all applications are incorporated by reference herein in their entirety.

BACKGROUND OF THE INVENTION

1. Field of the Invention

The present disclosure relates to a method of performing cell measurement and a method of providing information for cell measurement.

2. Background of the Invention

Recently, studies on a next-generation multimedia radio communication system have been actively conducted. The radio communication system requires a system that can process various information including images, radio data, etc. in lieu of services mainly using voice and transmit the information. The object of the radio communication system enables a plurality of users to perform reliable communication regardless of location and mobility. However, wireless channels suffer from several problems such as path loss, shadowing, fading, noise, limited bandwidth, power limitation of terminals and inter-user interference. Other challenges in the design of the radio communication system include resource allocation, mobility issues related to rapidly changing physical channels, portability and design for providing security and privacy.

When a transmission channel suffers from deep fading, if another version or replica of a signal transmitted to a receiver is not separately transmitted to the receiver, it is difficult for a receiver to determine the transmitted signal. A resource corresponding the separate version or replica is called as a diversity, and the diversity is one of the most important factors contributing to reliable transmission. If the transmission capacity or transmission reliability of data can be maximized using the diversity, and a system for implementing a diversity using multiple transmit and receive antennas is referred to as a multiple input multiple output (MIMO) system.

Techniques for implementing the diversity in the MIMO system are space frequency block code (SFBC), space time block code (STBC), cyclic delay diversity (CDD), frequency switched transmit diversity (FSTD), time switched transmit diversity (TSTD), precoding vector switching (PVS), spatial multiplexing (SM), etc.

Meanwhile, one of systems considered after the 3rd generation system is an orthogonal frequency division multiplexing (OFDM) system capable of reducing an inter-symbol interference effect with low complexity. The OFDM system converts serially input data into N parallel data and transmits the N parallel data respectively carried by N orthogonal subcarriers. The subcarrier maintains orthogonality in terms of frequencies. Orthogonal frequency division multiple access (OFDMA) refers to Orthogonal Frequency Division Multiple Access (OFDMA) refers to a multiple access method of realizing multi-access by independently providing users with some of available subcarriers in a system using OFDM as a modulation method.

FIG. 1 illustrates a radio communication system.

Referring to FIG. 1, the radio communication system includes at least one base station (BS) 20. Each of the BSs 20 provides a communication service for a specific terrestrial area (generally, referred to as a cell) 20a, 20b or 20c. The cell may be divided into a plurality of areas (also referred to as sectors). A user equipment (UE) 10 may be fixed or have mobility. The UE 10 may be called as other terms including a mobile station (MS), a subscriber station (SS), a wireless device, a personal digital assistant (PDA), a wireless modem, a handheld device, etc. The BS 20 generally refers to a fixed station communicating with the UEs 10, and may be called as other terms including an evolved-NodeB (eNB), a base transceiver system, an access point, etc.

Hereinafter, downlink (DL) means communication from a BS to a UE, and uplink (UL) means communication from a UE to a BS. In the DL, a transmitter may be a portion of the BS and a receiver may be a portion of the UE. In the UL, a transmitter may be a portion of the UE and a receiver may be a portion of the BS.

The radio communication system may be any one of a multiple input multiple output (MIMO) system, a multiple input single output (MISO) system, a single input single output (SISO) system and a single input multiple output (SIMO). The MIMO system uses a plurality of transmit antennas and a plurality of receive antenna. The MISO system uses a plurality of transmit antennas and one receive antenna. The SISO system uses one transmit antenna and one receive antenna. The SIMO system uses one transmit antenna and a plurality of receive antennas.

Hereinafter, the transmit antenna means a physical or logical antenna used to transmit one signal or stream, and the receive antenna means a physical or logical antenna used to receive one signal or stream.

Meanwhile, a long term evolution (LTE) system defined by 3rd generation partnership project (3GPP) employs the MIMO. Hereinafter, the LTE system will be described in detail.

FIG. 2 illustrates a structure of a radio frame in 3GPP LTE.

Referring to FIG. 2, the radio frame is composed of ten subframes, and one subframe is composed of two slots. The slots in the radio frame are designated by slot numbers from 0 to 19. The time at which one subframe is transmitted is referred to as a transmission time interval (TTI). The TTI may be called as a scheduling unit for data transmission. For example, the length of one radio frame may be 10 ms, the length of one subframe may be 1 ms, and the length of one slot may be 0.5 ms.

The structure of the radio frame is merely an example, and the number of subframes included in the radio frame, the number of slots included in the subframe, etc. may be variously modified.

FIG. 3 is an exemplary view illustrating a resource grid for one UL slot in the 3GPP LTE.

Referring to FIG. 3, the UL slot includes a plurality of OFDM symbols in a time domain, and includes $N^{UL}$ resource blocks (RBs) in a frequency domain. The OFDM symbol is used to represent one symbol period, may be called as an SC-FDMA symbol, OFDMA symbol or symbol period depending on a system. The BS includes a plurality of subcarriers in the frequency domain as a resource allocation unit. The number $N^{UL}$ of RBs included in the UL slot depends on the UL transmission bandwidth configured in a cell. Each element on a resource grid is referred to as a resource element.

Although it has been illustrated in FIG. 3 that one RB includes a 712 resource element composed of 7 OFDM symbols in the time domain and 12 subcarriers in the frequency domain, the number of subcarriers and the number of OFDM symbols in the RB are not limited thereto. The number of OFDM symbols and the number of subcarriers in the RB may be variously changed. The number of OFDM symbols may be changed depending on the length of a cyclic prefix (CP). For example, the number of OFDM symbols in a normal CP is 7, and the number of OFDM symbols in an extended CP is 6.

The resource grid for one UL slot in the 3GPP LTE of FIG. 3 may be applied to the resource grid for one DL slot.

FIG. 4 illustrates a structure of a DL subframe.

The DL subframe includes two slots in the time domain, and each of the slots includes seven OFDM symbols in the normal CP. Maximum three OFDM symbols (maximum four OFDM symbols for a bandwidth of 1.4 MHz) prior to a first slot in the subframe become a control region to which control channels are allocated, and the other OFDM symbols become a data region to which a downlink shared channel (PDSCH) is allocated. The PDSCH means a channel through which a BS transmits data to a UE.

A physical downlink control channel (PDCCH) may carry resource allocation (also referred to as DL grant) and transmission format on a downlink-shared channel (DL-SCH), resource allocation information (also referred to as UL grant) on a uplink-shared channel (UL-SCH), paging information on a paging channel (PCH), system information on the DL-SCH, resource allocation of an upper layer control message such as a random access response transmitted on the PDSCH, a set of transmission power control (TPC) for individual UEs in a UE group, activation of a voice over Internet protocol (VoIP), etc. The control information transmitted through the PDCCH as described above is referred as downlink control information (DCI).

Hereinafter, a downlink reference signal will be described in detail.

In the 3GPP LTE system, two kinds of DL reference signals, i.e., a common reference signal (RS) or cell-specific RS (CRS) and a dedicated RS or UE-specific RS (DRS) are defined so as to provide a unicast service.

The common RS is a reference signal shared by all UEs in a cell, and is used to obtain information on a channel state and perform handover measurement. The dedicated RS is a reference signal for only a specific UE, and is used to perform data demodulation. The CRS is a cell-specific reference signal, and DRS is a UE-specific reference signal.

The UE measures a common RS and informs the BS of feedback information such as channel quality information (CQI), precoding matrix indicator (PMI) and rank indicator (RI). The BS performs DL frequency domain scheduling using the feedback information received from the UE.

To transmit an RS to the UE, the BS allocates a resource in consideration of the amount of radio resource to be allocated to the RS, the exclusive position of the RS and the dedicated RS, the position of a synchronization channel (SCH) and a broadcast channel (BCH), the density of the dedicated RS, etc.

If a relatively large quantity of resource is allocated for the RS, it is possible to obtain a high channel estimation performance, but a data transmission rate is decreased. If a relatively small quantity of resource is allocated for the RS, it is possible to obtain a high data transmission rate, but the channel estimation performance may be degraded due to a low density of the RS.

Meanwhile, in the 3GPP LTE system, the DRS is used only for data demodulation, and the CRS are used for both objects of channel information acquisition and data demodulation. Particularly, the CRS is transmitted every subframe in a broad band, and is transmitted for each antenna port of the BS. For example, when the number of transmit antennas of the BS is two, CRSs for antenna ports 0 and 1 are transmitted. When the number of transmit antennas of the BS is four, CRSs for antenna ports 0 to 3 are transmitted.

FIG. 5 illustrates an example of the structure of the uplink subframe in the 3GPP LTE.

Referring to FIG. 5, the uplink subframe may be divided into a control region in which a physical uplink control channel (PUCCH) carrying uplink control information is allocated and a data region in which a physical uplink shared channel (PUSCH) carrying uplink data information is allocated. To maintain a single carrier property, RSs allocated to one UE are contiguous in the frequency domain. The one UE cannot transmit the PUCCH and the PUSCH at the same time.

The PUCCH for one UE is allocated as an RB pair in a subframe. RBs constituting the RB pair occupy different subcarriers in first and second slots, respectively. The frequency occupied by each of the RBs constituting the RB pair is changed at a boundary between the slots. The UE transmits uplink control information through different subcarriers according to time, thereby obtaining a frequency diversity gain.

The uplink control information transmitted on the PUCCH includes hybrid automatic repeat request (HARQ) acknowledgement (ACK)/negative acknowledgement (NACK), channel quality indicator indicating a downlink channel state, scheduling request (SR) that is an uplink radio resource allocation request, etc.

The PUSCH is mapped to the UL-SCH that is a transport channel. Uplink data transmitted on the PUSCH may be a transport block that is a data block for the UL-SCH transmitted for the TTI. The transport block may be user information, or the uplink data may be multiplexed data. The multiplexed data may be data obtained by multiplexing the transport block for the UL-SCH and control information. For example, the control information multiplexed by the data may include CQI, PMI, HARQ ACK/NACK, RI, etc. The uplink data may be composed of only the control information.

Meanwhile, a high data transmission rate is required, and the most basic and stable plan for solving the high data transmission rate is to increase a bandwidth.

However, frequency resources are currently in a saturation state, various technologies are partially used in a wide frequency band. For this reason, carrier aggregation (CA) has been introduced as a plan for securing a wideband bandwidth in order to satisfy the requirement of the high data transmission rate. Here, the CA is a concept of designing to satisfy basic requirements that an independence system is operable in each of the scattered bands and binding a plurality of bands using one system. In the CA, the band in which the independent system is operable is defined as a component carrier (CC).

The CA is employed not only in an LTE system but also in an LTE-advanced (hereinafter, referred to as an 'LTE-A').

Carrier Aggregation

A carrier aggregation system refers to a system that forms a wide band by aggregating one or more carriers having a bandwidth narrower than a desired wideband when a radio communication system intends to support the wideband. The carrier aggregation system may be called as other terms including a multiple carrier system, a bandwidth aggregation system, etc. The carrier aggregation system may be divided into a contiguous carrier aggregation system in which carriers are contiguous and a non-contiguous carrier aggregation system in which carriers are separated from one another. Hereinafter, when the carrier aggregation system is simply called as a multiple carrier system or carrier aggregation system, it should be understood that the carrier aggregation system includes both cases in which component carriers are contiguous and in which component carriers are non-contiguous.

In the contiguous carrier aggregation system, a guard band may exist between carriers. When one or more carriers are aggregated, the carriers to be aggregated may use the bandwidth used in a conventional system as it is for the purpose of backward compatibility with the conventional system. For example, the 3GPP LTE system supports bandwidths of 1.4 MHz, 3 MHz, 5 MHz, 10 MHz, 15 MHz and 20 MHz. Alternatively, the 3GPP LTE does not use the bandwidth used in the conventional system as it is but may form a wideband by defining a new bandwidth.

In the carrier aggregation system, the UE may simultaneously transmit or receive one or a plurality of carriers according to its capacity.

FIG. 6 illustrates an example of performing communication under a single component carrier situation. FIG. 6 may correspond to an example of performing communication in an LTE system.

Referring to FIG. 6, a general frequency division duplex (FDD) radio communication system transmits/receives data through one downlink band and one uplink band corresponding thereto. The BS and the UE transmits/receive data and/or control information scheduled as a subframe unit. The data is transmitted/received through the data region configured in the uplink/downlink subframe, and the control information is transmitted/received through the control region configured in the uplink/downlink subframe. To this end, the uplink/downlink subframe carries signals through various physical channels. Although the FDD radio communication system has been mainly described in FIG. 6, the aforementioned description may be applied to a time division duplex (TDD) radio communication system by dividing a radio frame into uplink/downlink radio frames in the time domain.

FIG. 7 illustrates an example of performing communication under a multiple component carrier situation. FIG. 7 may correspond to an example of performing communication in an LET-A system.

The LTE-A system uses a carrier aggregation, bandwidth aggregation or spectrum aggregation using a wider uplink/downlink bandwidth by aggregating a plurality of uplink/downlink frequency blocks so as to use a wider frequency band. Each of the frequency blocks is transmitted using a component carrier (CC). In this specification, the CC may mean a frequency block for carrier aggregation or a central carrier of the frequency block according to the context, and the frequency block and the central carrier are used together.

On the other hand, the 3GPP LTE system supports a case in which the uplink/downlink bandwidths are configured differently, but supports one CC in each of the uplink/downlink bandwidths. The 3GPP LTE system supports a maximum bandwidth of 20 MHz, and supports only one CC in each of the uplink/downlink bandwidths. Here, the uplink/downlink bandwidths may be different from each other.

However, the spectrum aggregation (bandwidth aggregation or carrier aggregation) supports a plurality of CCs. For example, if five CCs are allocated as the granularity of a carrier unit having a bandwidth of 20 MHz, the spectrum aggregation can support a maximum bandwidth of 100 MHz.

A pair of DL CC or UL CC and DL CC may correspond to one cell. The one cell basically includes one DL CC and optionally includes UL CC. Therefore, it may be considered that the UE communicating with the BS through a plurality of DL CCs receive services from a plurality of serving cells. The DL is composed of a plurality of DL CCs, but the UL may use only one CC. In this case, it may be considered that the UE receives services from a plurality of serving cells in the DL and receives a service from one serving cell in the UL.

In this meaning, the serving cell may be divided into a primary cell and a secondary cell. The primary cell operates at a primary frequency, and is used to perform an initial connection establishment process, connection re-establishment process or handover process of the UE. The primary cell is also referred to as a reference cell. The secondary cell operates at a secondary frequency, and may be configured after RRC connection is established. The secondary cell may be used to provide an additional radio resource. At least one primary cell is always configured, and the secondary cell may be added/modified/cancelled by upper layer signaling (e.g., an RRC message).

Referring to FIG. 7, five CCs having a bandwidth of 20 MHz may be aggregated in each of the UL/DL, thereby supporting a bandwidth of 100 MHz. CCs may be adjacent or non-adjacent to one another in the frequency domain. For convenience, FIG. 9 illustrates a case in which the bandwidths of UL and DL CCs are identical and symmetric to each other. However, the bandwidth of each of the CCs may be independently determined. For example, the bandwidth of the UL CC may be configured as 5 MHz(UL CC0)+20 MHz(UL CC1)+20 MHz(UL CC2)+20 MHz(UL CC3)+5 MHz(UL CC4). Asymmetric carrier aggregation may be implemented in which the number of UL CCs is different from that of DL CCs. The asymmetric carrier aggregation may be formed due to limitation of an available frequency band or may be artificially formed by network configuration. For example, although the frequency band of the entire system is composed of N CCs, the frequency band received by a specific UE may be limited to M(<N) CCs. Various parameters for the CA may be configured in a cell-specific, UE group-specific or UE-specific manner.

Although it has been illustrated in FIG. 7 that the UL and DL signals are respectively transmitted through CCs mapped one by one, the CC through which a signal is substantially transmitted may be changed depending on the network configuration or kind of signal.

For example, when a scheduling command is downlink-transmitted through the DL CC1, data according to the scheduling data may be transmitted through another DL CC or UL CC. Control information related on the DL CC may be uplink-transmitted through a specific UL CC regardless of the presence of mapping. Similarly, DL control information may also be transmitted through a specific DL CC.

FIG. 8 is a block diagram illustrating a single carrier-frequency division multiple access (SC-FDMA) transmission scheme that is an uplink access scheme employed in the 3GPP LTE.

SC-FDMA is employed in the uplink of LTE. Here, the SC-FDMA is a scheme similar to OFDM, but can reduce power consumption of a portable terminal and cost of a power amplifier by decreasing a peak to average power ratio (PAPR).

The SC-FDMA is a scheme similar to the OFDM in which a signal is divided into sub-bands to be transmitted through sub-carriers using fast Fourier transform (FFT) and inverse-FFT (IFFT). The SC-FDMA is identical to the conventional OFDM scheme in that a guard interval (cyclic prefix) is used so that it is possible to utilize a simple equalizer in the frequency domain with respect to inter-symbol interference (ISI). However, the power efficiency of a transmitter has been improved by decreasing the PAPR at a transmitter terminal by about 2 to 3 dB using an additional unique technique.

That is, the problem of the conventional OFDM receiver is that signals carried by each sub-carrier on a frequency axis are converted into signals on a time axis by the IFFT. Since parallel equal operations are performed in the IFFT, an increase in the PAPR occurs.

Referring to FIG. 8, to solve such a problem, a discrete Fourier transform (DFT) 12 is first performed on information before a signal is mapped to a sub-carrier in the SC-FDMA. Sub-carrier mapping 13 is performed on a signal spread (or precoded in the same meaning) by the DFT, and the signal subjected to the sub-carrier mapping is converted into a signal in the time axis by performing an IFFT 14.

In this case, unlike the OFDM, the PAPR of a signal in the time domain after the IFFT 14 is not increased so much by the correlation among the DEF 12, the sub-carrier mapping 13 and the IFFT 14, and thus the SC-FDMA is advantageous in terms of transmission power efficiency.

That is, a transmission scheme in which the IFFT is performed after DFT spreading is referred to as the SC-FDMA.

As such, the SC-FDMA has a similar structure to the OFDM, thereby obtaining the signal strength for a multi-path channel, and the SC-FDMA completely prevents the PAPR from being increased through the through the IFFT in the conventional OFDM, thereby enabling the use of a power amplifier. Meanwhile, the SC-FDMA may also be called as DEF spread OFDM (DEF-s-OFDM).

That is, the PAPR or cubic metric (CM) may be decreased in the SC-FDMA. When the SC-FDMA transmission scheme is used, it is possible to avoid a non-linear distortion period of the power amplifier, and thus the transmission power efficiency can be improved in an UE of which power consumption is limited. Accordingly, it is possible to increase a user throughput.

Meanwhile, the standardization of the LTE-A more improved than the LTE has been actively performed in the 3GPP. In the process of standardizing the LTE-A, the SC-FDMA-based scheme and the OFDM scheme competed with each other, but a clustered DEF-s-OFDM scheme that allows non-contiguous resource allocation has been employed.

Hereinafter, the LTE-A system will be described in detail.

FIG. 9 is a block diagram a clustered discrete Fourier transform-spread-orthogonal frequency division multiplexing (DFT-s-OFDM) transmission method employed as an uplink access method in the LTE-advanced standard.

The important feature of the clustered DFT-s-OFDM is that it is possible to flexibly cope with a frequency selective fading environment by enabling frequency selective resource allocation.

In the clustered DFT-s-OFDM scheme employed as the uplink access scheme of the LTE-A, the non-contiguous resource allocation is allowed differently from the SC-FDMA that is an uplink access scheme of the conventional LTE, and thus transmitted uplink data can be divided into several cluster units.

That is, the LTE system maintains a single carrier characteristic in the UL. On the other hand, the LTE-A allows a case in which data subjected to DFT-precoding is non-contiguously allocated on the frequency axis or the PUSCH and PUCCH are transmitted at the same time.

SUMMARY OF THE INVENTION

Therefore, an aspect of the detailed description is to provide a method of performing cell measurement and a method of providing information for cell measurement, which enable a UE to effectively measure reference signal received power (RSRP) and reference signal received quality (RSRQ).

Another aspect of the detailed description is to provide a method capable of efficiently measuring RSRP and RSRQ of serving and neighboring cells in an environment in which base stations of different networks coexist in an LTE-based radio communication system.

Still another aspect of the detailed description is to provide a method capable of efficiently measuring RSRP and RSRQ of serving and neighboring cells when enhanced inter-cell interference coordination (eICIC) is driven in an LTE-A system currently discussed in the 3GPP.

To achieve these and other advantages and in accordance with the purpose of this specification, as embodied and broadly described herein, there is provided a method of providing information for cell measurement, the method including: configuring a subframe for performing measurement with respect to a first cell, wherein the configured subframe is different from a subframe for performing measurement with respect to a second cell; and transmitting, from the first cell to a user equipment (UE), a first pattern information on the configured subframe and a second pattern information indicating the subframe for performing measurement with respect to the second cell, wherein the first or second pattern information indicates the subframe for measurement as a bit '1,' and the first or second pattern information indicates at least one subframe a per radio frame, used for performing the measurement.

The first or second pattern information may be represented as a bit stream, and a first bit of the bit stream may correspond to a zeroth subframe of a frame satisfying SFN mod x=0. Here, the x denotes a size obtained by dividing 10 into the bit stream, and the SFN denotes a system frame number.

The first or second pattern information may be a time domain measurement resource restriction pattern or measSubframePattern.

The first pattern information may be measSubframePattern-Serv, or the second pattern information may be measSubframePattern-Neigh.

The configured subframe may be configured in consideration of a general almost black subframe (ABS) or MBMS single frequency network (MBSFN) ABS other than an MBSFN.

The second pattern information is received through X2 interface-based signaling.

In the transmitting of the first and second pattern information, the first pattern information may be transmitted through a radio resource control (RRC) message.

The RRC message is an RRC connection reconfiguration message.

To achieve the above aspect of this specification, there is provided a method of performing measurement in a UE placed within a coverage of a serving cell and a coverage of a neighboring cell, the method including: obtaining pattern information on a subframe for performing measurement, wherein the pattern information of the serving cell is configured differently from that of the neighboring cell; and performing measurement on the serving cell and the neighboring cell on different subframes according to the pattern information, wherein the pattern information indicates the subframe for measurement as a bit '1,' and the pattern information indicates at least one subframe per radio frame, used for performing the measurement.

The pattern information may be represented as a bit stream, and a first bit of the bit stream may correspond to a zeroth subframe of a frame satisfying SFN mod x=0. Here, the x denotes a size obtained by dividing 10 into the bit stream, and the SFN denotes a system frame number.

The pattern information may be a time domain measurement resource restriction pattern or measSubframePattern.

The pattern information may include a first pattern information on the serving cell and a second pattern information on the neighboring cell. The first pattern information may be measSubframePattern-Neigh, or the second pattern information may be measSubframePattern-Serv The subframe may be configured as a general ABS or MBSFN ABS other than an MBSFN.

The performing of the measurement may include measuring one or more of reference signal received power (RSRP) and reference signal received quality (RSRQ) through a cell-specific reference signal (CRS).

To achieve the above aspect of this specification, there is provided a base station including: a controller configured to configure a subframe for performing measurement, wherein the configured subframe is different from a subframe for performing measurement on a neighboring cell; and a transmitter configured to transmit a first pattern information on the configured subframe and a second pattern information indicating the subframe for performing the measurement with respect to the neighboring cell to a UE, wherein the first or second pattern information indicates the subframe for measurement as a bit '1,' and the first or second pattern information indicates at least one subframe per radio frame, used for performing the measurement.

To achieve the above aspect of this specification, there is provided a UE including: a receiver configured to obtain pattern information on a subframe for performing measurement from a serving cell; and a controller configured to perform measurement with respect to the serving cell and a neighboring cell on different subframes according to the pattern information, when a user equipment is placed within a coverage of the serving cell and a coverage of the neighboring cell, wherein the pattern information indicates the subframe for measurement as a bit '1,' and the pattern information indicates at least one subframe per radio frame, used for performing the measurement.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Figure 1:
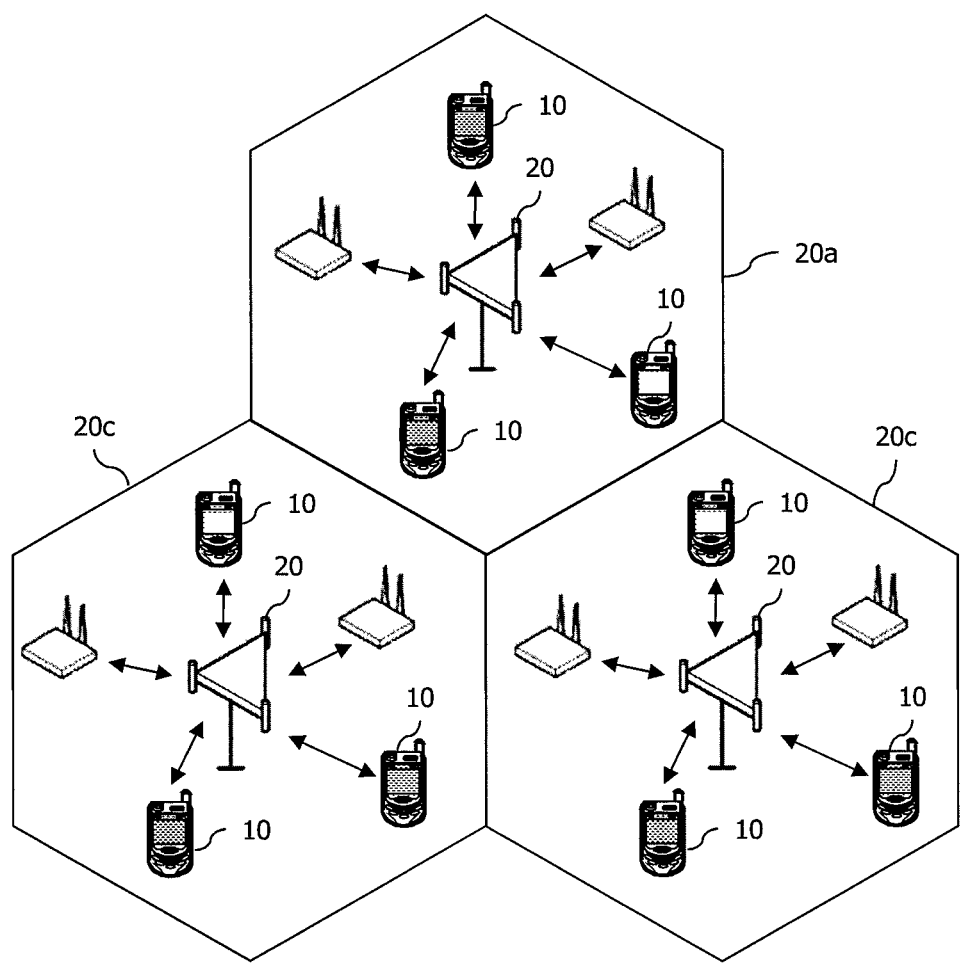
FIG. 1 illustrates a radio communication system.
Figure 2:
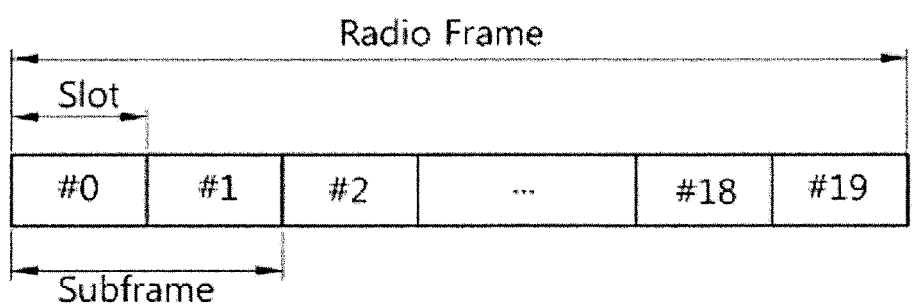
FIG. 2 illustrates a structure of a radio frame in 3rd generation partnership project long term evolution (3GPP LTE)
Figure 3:
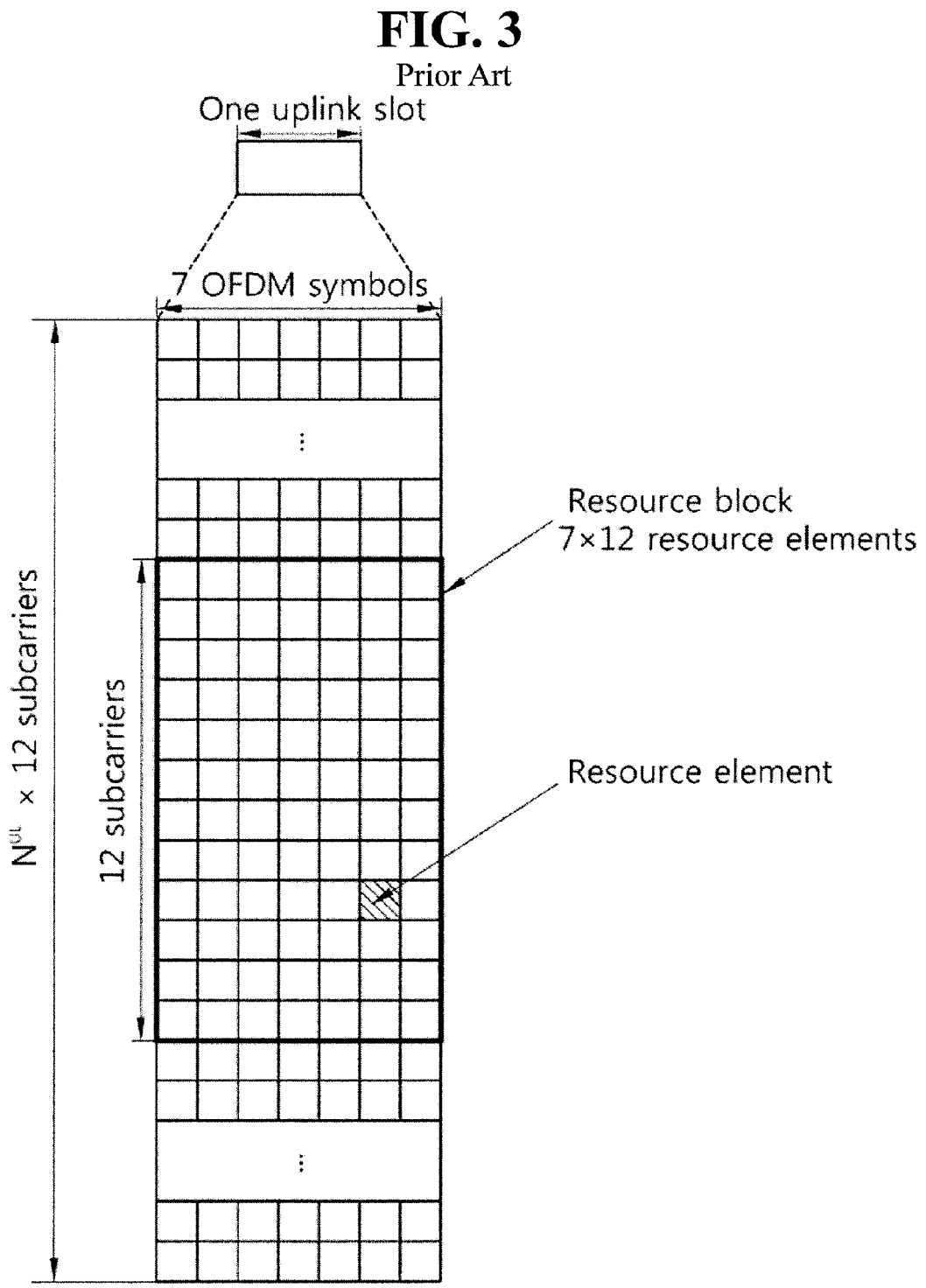
FIG. 3 is an exemplary view illustrating a resource grid for one uplink slot in the 3GPP LTE.
Figure 4:
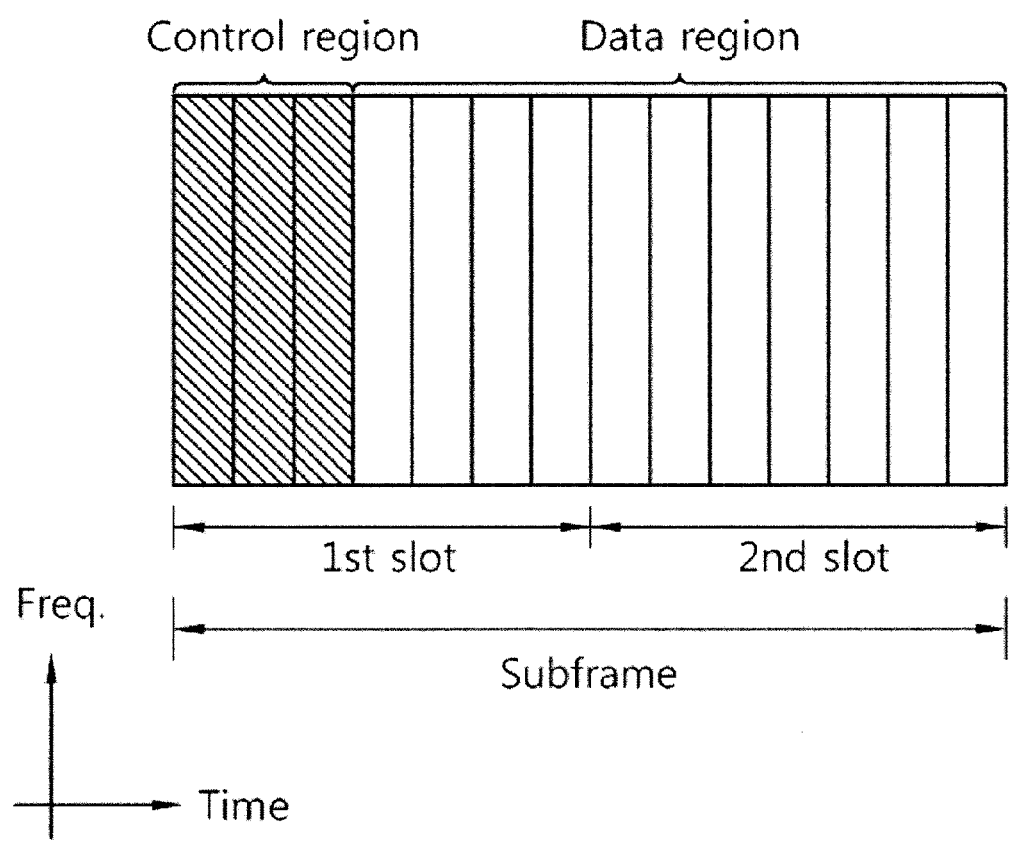
FIG. 4 illustrates a structure of a downlink subframe.
Figure 5:
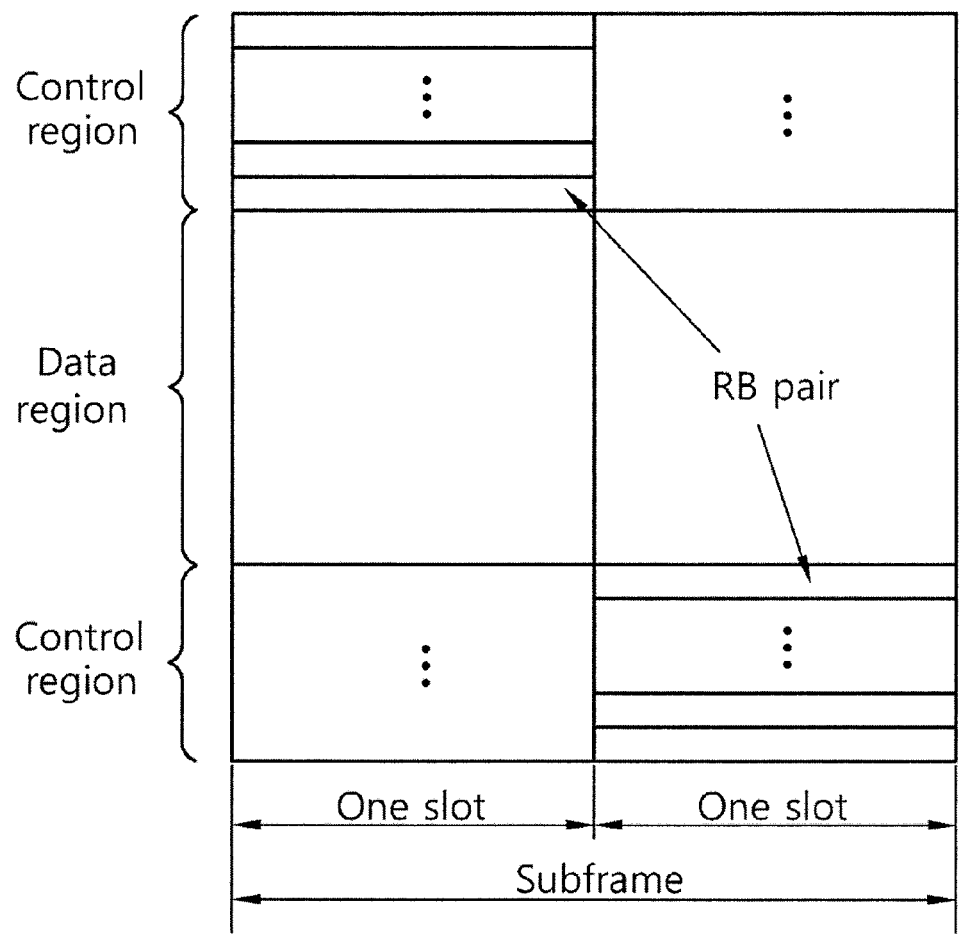
FIG. 5 illustrates an example of the structure of the uplink subframe in the 3GPP LTE.
Figure 6:
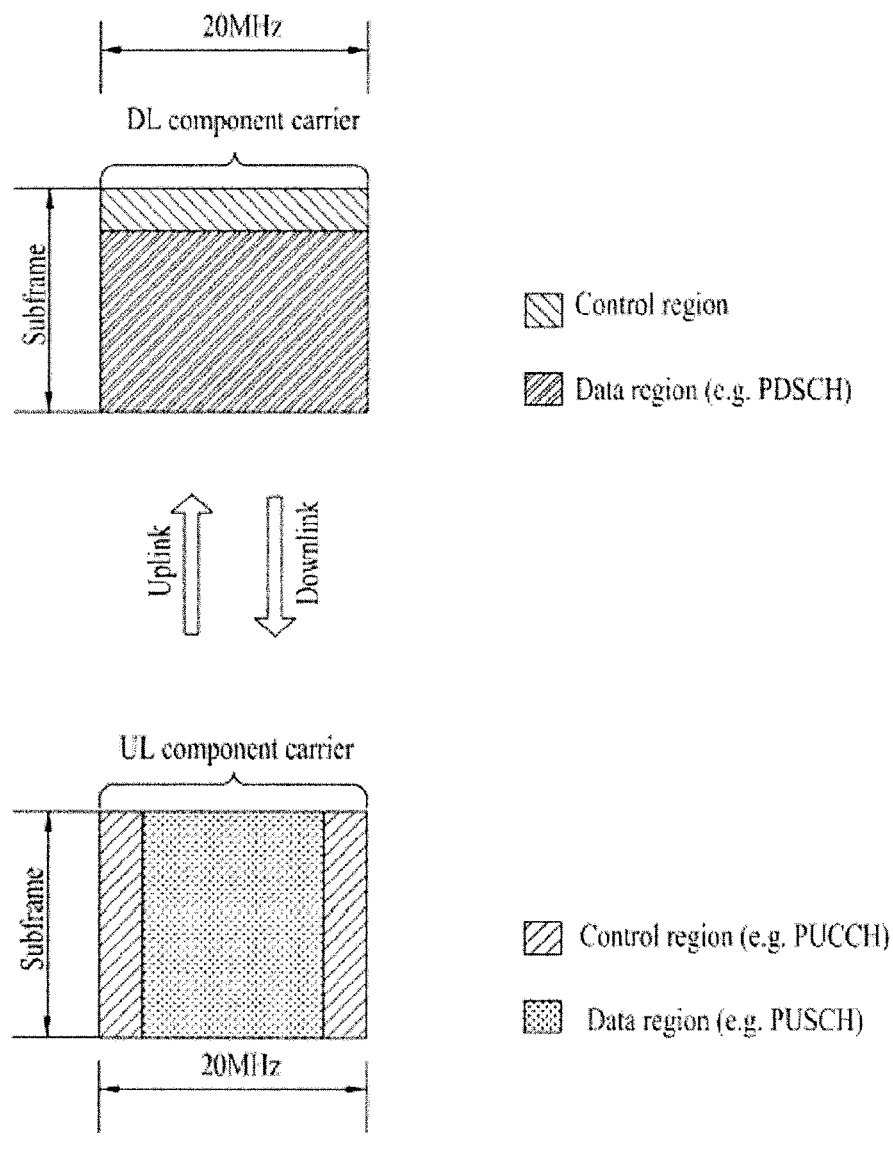
FIG. 6 illustrates an example of performing communication under a single component carrier situation.
Figure 7:
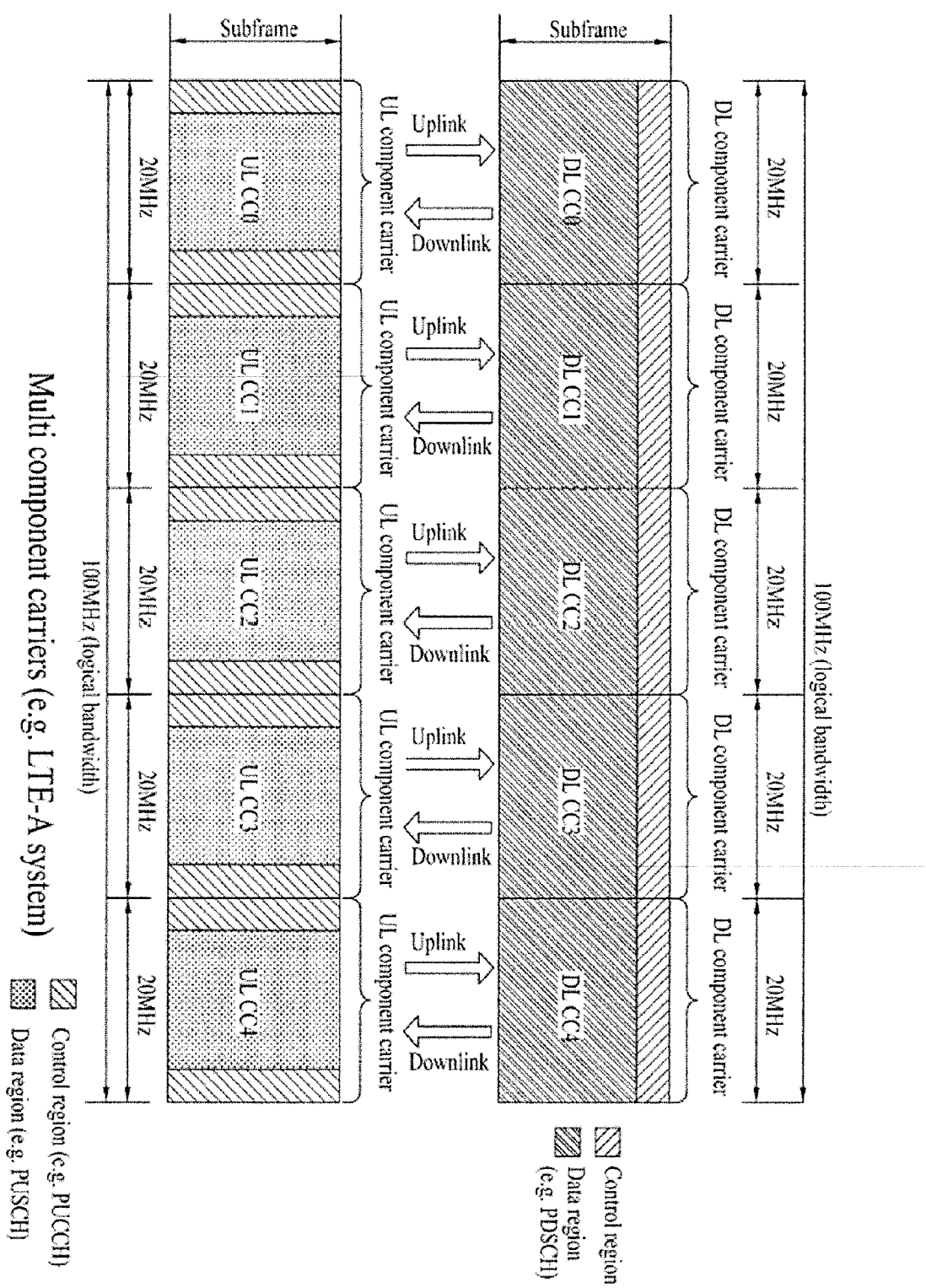
FIG. 7 illustrates an example of performing communication under a multiple component carrier situation.
Figure 8:
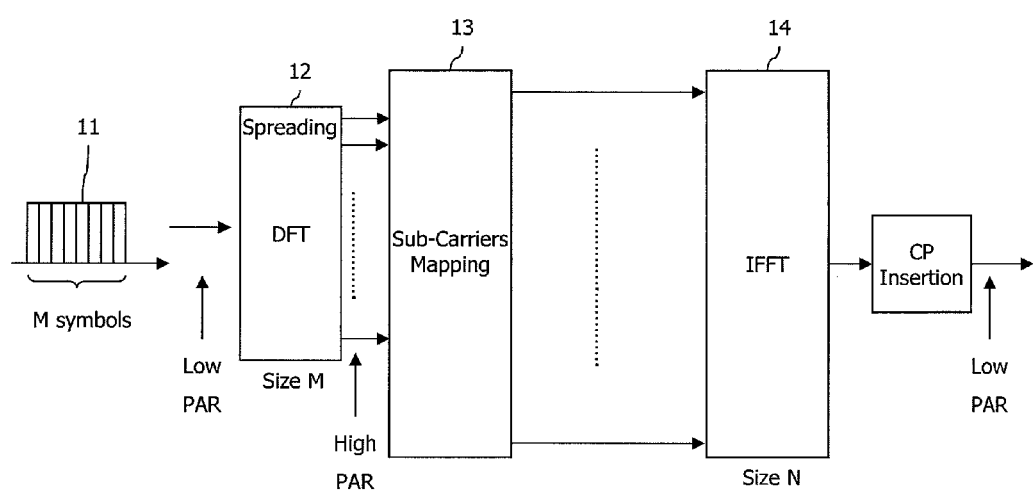
FIG. 8 is a block diagram illustrating a single carrier-frequency division multiple access (SC-FDMA) transmission scheme that is an uplink access scheme employed in the 3GPP LTE.
Figure 9:
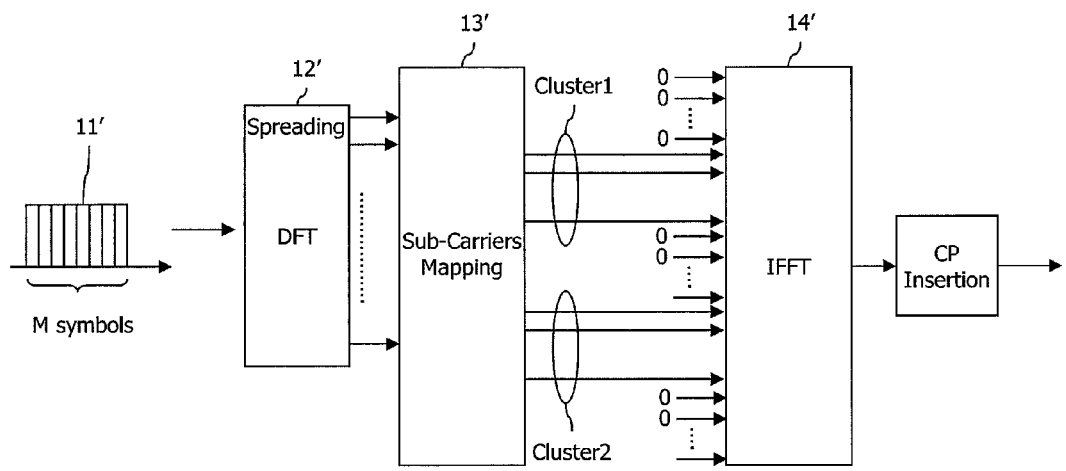
FIG. 9 is a block diagram a clustered discrete Fourier transform-spread-orthogonal frequency division multiplexing (DFT-s-OFDM) transmission method employed as an uplink access method in the LTE-advanced standard.

The following technology may be used in various multiple access schemes such as code division multiple access (CDMA), frequency division multiple access (FDMA), time division multiple access (TDMA), orthogonal frequency division multiple access (OFDMA) and single carrier-frequency division multiple access (SC-FDMA). The CDMA may be implemented by a radio technology such as universal terrestrial radio access (UTRA) or CDMA2000. The TDMA may be implemented by a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20 or evolved UTRA (E-UTRA). The UTRA is a portion of a universal mobile telecommunications system (UMTS). 3rd generation partnership project (3GPP) long term evolution (LTE) is a portion of an evolved UMTS (E-UMTS) using the E-UTRA, which employs the OFDMA in downlink and the SC-FDMA in uplink. LTE-advanced (LTE-A) is an evolution of the 3GPP LTE.

Technical terms used in this specification are used to merely illustrate specific embodiments, and should be understood that they are not intended to limit the present disclosure. As far as not being defined differently, all terms used herein including technical or scientific terms may have the same meaning as those generally understood by an ordinary person skilled in the art to which the present disclosure belongs to, and should not be construed in an excessively comprehensive meaning or an excessively restricted meaning. In addition, if a technical term used in the description of the present disclosure is an erroneous term that fails to clearly express the idea of the present disclosure, it should be replaced by a technical term that can be properly understood by the skilled person in the art. In addition, general terms used in the description of the present disclosure should be construed according to definitions in dictionaries or according to its front or rear context, and should not be construed to have an excessively restrained meaning.

The terminology used herein is for the purpose of describing particular embodiments only and is not intended to be limiting of the invention. It will be further understood that the terms "includes" and/or "including," when used in this specification, specify the presence of stated features, integers, steps, operations, elements, and/or components, but do not preclude the presence and/or addition of one or more other features, integers, steps, operations, elements, components, and/or groups thereof.

In the following description, suffixes "module" and "unit or portion" for components used herein in description are merely provided only for facilitation of preparing this specification, and thus they are not granted a specific meaning or function.

It will be understood that, although the terms "first," "second," etc. may be used herein to describe various elements, these elements should not be limited by these terms. These terms are only used to distinguish one element from another element. Thus, a "first" element discussed below could also be termed as a "second" element without departing from the teachings of the present invention.

In the drawings, the thickness of layers, films and regions are exaggerated for clarity. Like numerals refer to like elements throughout.

Description will now be given in detail of the exemplary embodiments, with reference to the accompanying drawings. For the sake of brief description with reference to the drawings, the same or equivalent components will be provided with the same reference numbers, and description thereof will not be repeated. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Hereinafter, although a user equipment (UE) is shown in the drawings, the UE may be called as a terminal, mobile equipment (ME), a mobile station (MS), user terminal (UT), subscriber station (SS), wireless device, handheld device or access terminal (AT). The UE may be a portable device having a communication function, such as a cellular phone, personal digital assistant (PDA), smart phone, wireless modem or notebook computer, or may be a device that cannot be carried, such as a personal computer (PC) or vehicle mounting device.

Figure 10:
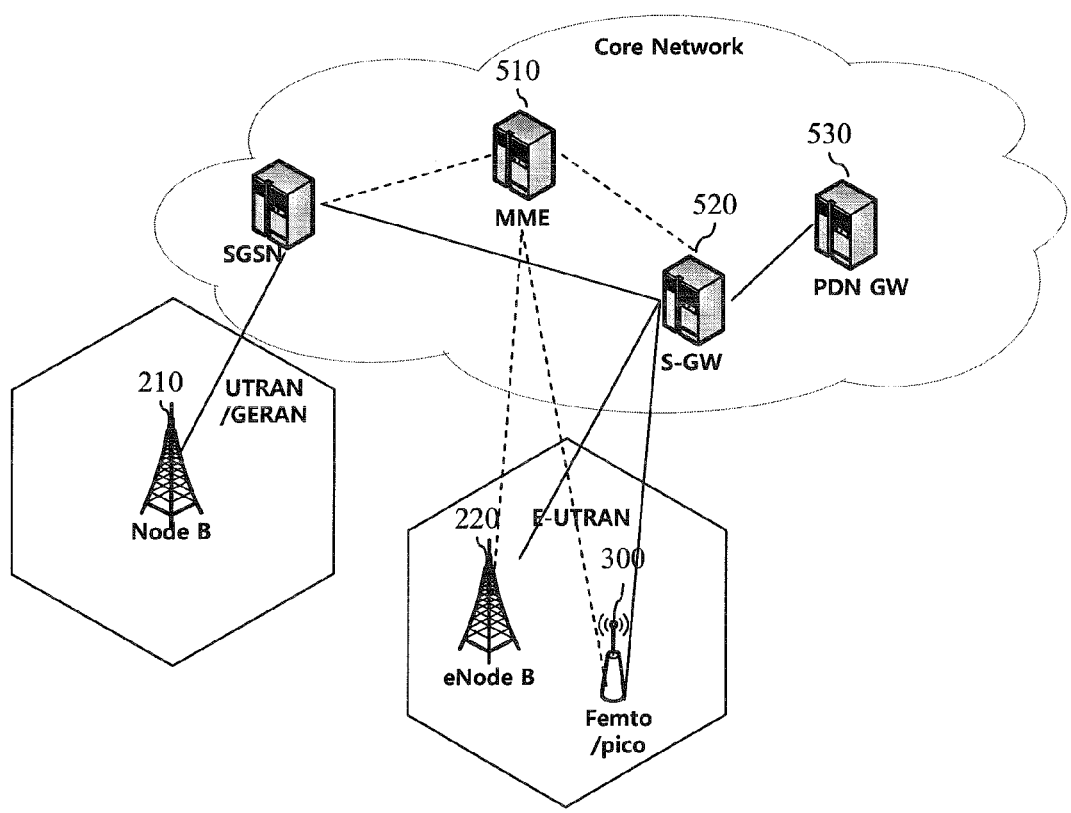
FIG. 10 is a structural diagram of an evolved mobile communication network.

FIG. 10 is a structural diagram of an evolved mobile communication network.

One of the important characteristics in the structure of the network of FIG. 10 is that it is based on a 2 tier model an eNodeB 220 of the evolved UTRAN and a gateway (GW) of the core network. The eNodeB 220 has a similar function, although not exactly the same, to an eNodeB 210 and RNC of the existing UMTS system, and the gateway has a function similar to the SGSN/GGSN of the existing system.

Another important characteristic is that different interfaces are exchanged by the control plane and the user plane between the access network and the core network. While an Iu interface exists between the RNC and SGSN in the existing UMTS system, a mobile management entity (MME) 510 handling the processing of a control signal has a structure separated from the GW, and therefore, two separate interfaces, i.e., S1-MME and S1-U, are used. The GW includes a serving-gateway (hereinafter, referred to as an S-GW 520) and a packet data network gateway (hereinafter, referred to as a PDN-GW or P-GW 530).

Meanwhile, in the 3rd or 4th generation mobile communication system, attempts to increase the capacity of a cell are continuously made to support high-capacity and bidirectional services including streaming, etc.

That is, as various large-capacity transmission technologies are required together with the development of communications and the spread of multimedia technologies, a method of allocating a larger number of frequency resources may be used as a method of increasing radio capacity. However, since the number of frequency resources is limited, there is a limitation when the larger number of frequency resources are allocated to a plurality of users.

Approaches for using a high frequency band and decreasing the radius of a cell have been made to increase the capacity of the cell. A pico or femto cell applied to a cell having a small radius can use a higher frequency band than the frequency used in the existing cellular system, and thus it is possible to transmit a larger amount of information. However, since a larger number of base stations (BSs) are installed in the same area, installation cost is increased.

An approach for using a femto/pico cell has been proposed among the approaches for increasing the capacity of the cell having the small radius. The pico cell refers to a small-sized cell having a radius smaller than that of a macro cell, and the femto cell refers to a cell managed by a home eNodeB (HeNB). Since the pico cell is installed by a provider and the femto cell is installed by a user, it is assumed that the provider does not exactly recognize the existence of the femto cell in the 3GPP.

In the 3GPP, studies on the femto/pico cell 300 have been mainly conducted by RAN WG3 under the name of home (e)NodeB. In this case, the eNodeB 220 or NodeB 210 is relatively referred to as a macro cell. Hereinafter, when the NodeB 210 or eNodeB 220 are referred to as a macro cell, reference numeral 200 is used.

In this specification, descriptions will be given based on terminologies of the 3GPP, and the (e)NodeB is used when the NodeB or eNodeB is mentioned together with the (e)NodeB.

Interfaces shown by a dotted line are used for transmission of a control signal between the femto/pico cell 300 and the MME 510. Interfaces shown by a solid line are used for transmission of data on a user plane.

Figure 11:
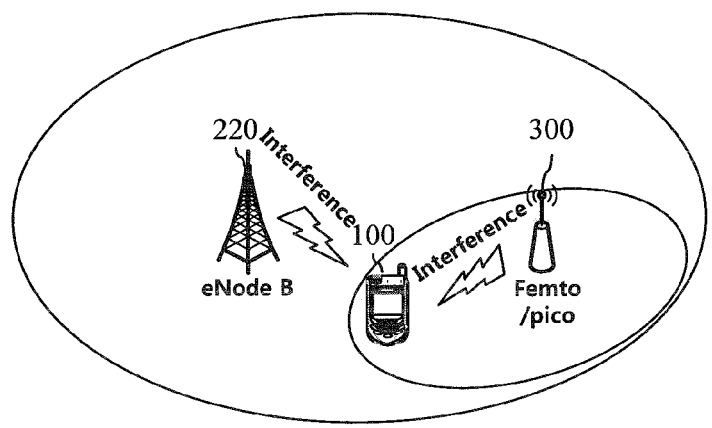
FIG. 11 illustrates a case in which pico and femto cells coexist within a coverage of a macro cell.

FIG. 11 illustrates a case in which pico and femto cells coexist within a coverage of a macro cell.

As shown in FIG. 11, when different kinds of networks including the pico/femto cells, etc. coexist within the coverage of a macro cell, the interference between the networks is problematic.

That is, the pico or femto cell is placed in the macro cell, and in this situation, an UE place at the boundary between the overlapped cells is influenced by interference between signals transmitted from the respective cells.

As a specific example, when a UE 100 connected to the pico cell 200 is placed at a boundary of the pico cell 300, the connection between the UE 100 and the pico cell 300 may be stopped due to the interference from the macro cell 200. This means that the coverage of the pico cell 300 is narrower than the expectation of the provider.

As another example, when the UE 100 connected to the macro cell 200 is placed in the area of the femto cell 300, the connection between the UE 100 and the macro cell 200 may be stopped due to the interference from the femto cell 300. This means that a shadow region in the macro cell 200 has occurred.

The first example is called as a macro-pico problem and the second example is called as a macro-femto problem. These problems have come into the limelight as important problems to be solved in the different kinds of networks.

The most basic method for solving such an interference problem is that different frequencies are used between the different kinds of networks. However, since the frequencies are scarce and expensive resources, the solution through frequency division was not welcomed by the provider.

Therefore, attempts to solve the inter-cell interference problem have been made through time division in the 3GPP.

Accordingly, studies on enhanced inter-cell interference coordination (eICIC) have recently been actively conducted as one of interference coordination methods in the 3GPP.

The time division method introduced in LTE Release-10 is called as the eICIC meaning that the time division method has been evolved as compared with the existing frequency division method. Here, a cell causing interference is defined as an aggressor cell or primary cell, and a cell receiving interference is defined as a victim cell or secondary cell. The time division method is a method is a method in which the aggressor cell or primary cell stops data transmission in a specific subframe, so as to enable the UE to maintain connection to the victim cell or secondary cell in the corresponding subframe. That is, in the time division method, when the macro cell and pico cell or the macro cell and femto cell coexist, one BS temporarily stops the transmission of a signal to the UE receiving a considerably high interference in any area, so that an interference signal is hardly transmitted to the UE.

In the macro-pico or macro-femto problem described above, the macro cell may be the aggressor cell or primary cell, and the pico cell may be the victim cell or secondary cell. On the contrary, the pico cell may be the aggressor cell or primary cell, and the macro cell may be the victim cell or secondary cell.

Meanwhile, the specific subframe in which the data transmission is stopped is referred to as an almost blank subframe (ABS), and any data except essentially required control information is not transmitted in a subframe according to the ABS. The essentially required control information is, for example, a cell-specific reference signal (CRS). In the current 3GPP LTE/LTE-A standard, the CRS exists on zeroth, fourth, seventh and eleventh OFDM symbols in each subframe on the time axis.

In a next-generation mobile communication system, a multimedia broadcast/multicast service has been proposed for the purpose of broadcasting services.

Figure 12:
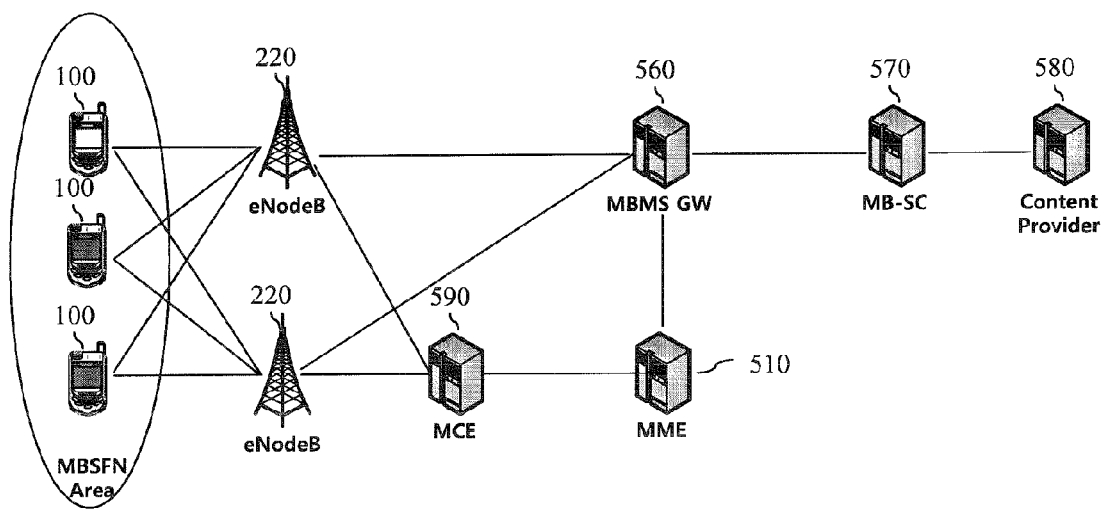
FIG. 12 illustrates a system for implementing a multimedia broadcast/multicast service (MBMS)

FIG. 12 illustrates a system for implementing a multimedia broadcast/multicast service (MBMS).

As can be seen with reference to FIG. 12, the system for implementing the MBMS includes an MBMS GW 560, an MB-SC 570, a content provider 580 and an MCE 590, in addition to the eNodeB 220 and the MME 510.

Meanwhile, an MBMS single frequency network (MBSFN) in which a plurality of eNodeBs 220 transmit the same data at the same time is applied in one service area.

The MBMS refers to a service that provides a streaming service, background broadcast service or multicast service to a plurality of UEs using a downlink-dedicated MBMS bearer service. In this case, the MBMS may be divided into a multi-cell service in which the same service is provided to a plurality of cells and a single cell service in which one service is provided to only one cell.

When the UE receives the multi-cell service, the UE may receive the multi-cell service by combining the same service transmitted from several cells through the MBSFN scheme.

Meanwhile, the subframe through which the MBMS is transmitted is signaled to an MBSFN subframe, so that the UE can recognize the transmitted MBMS.

Figure 13:
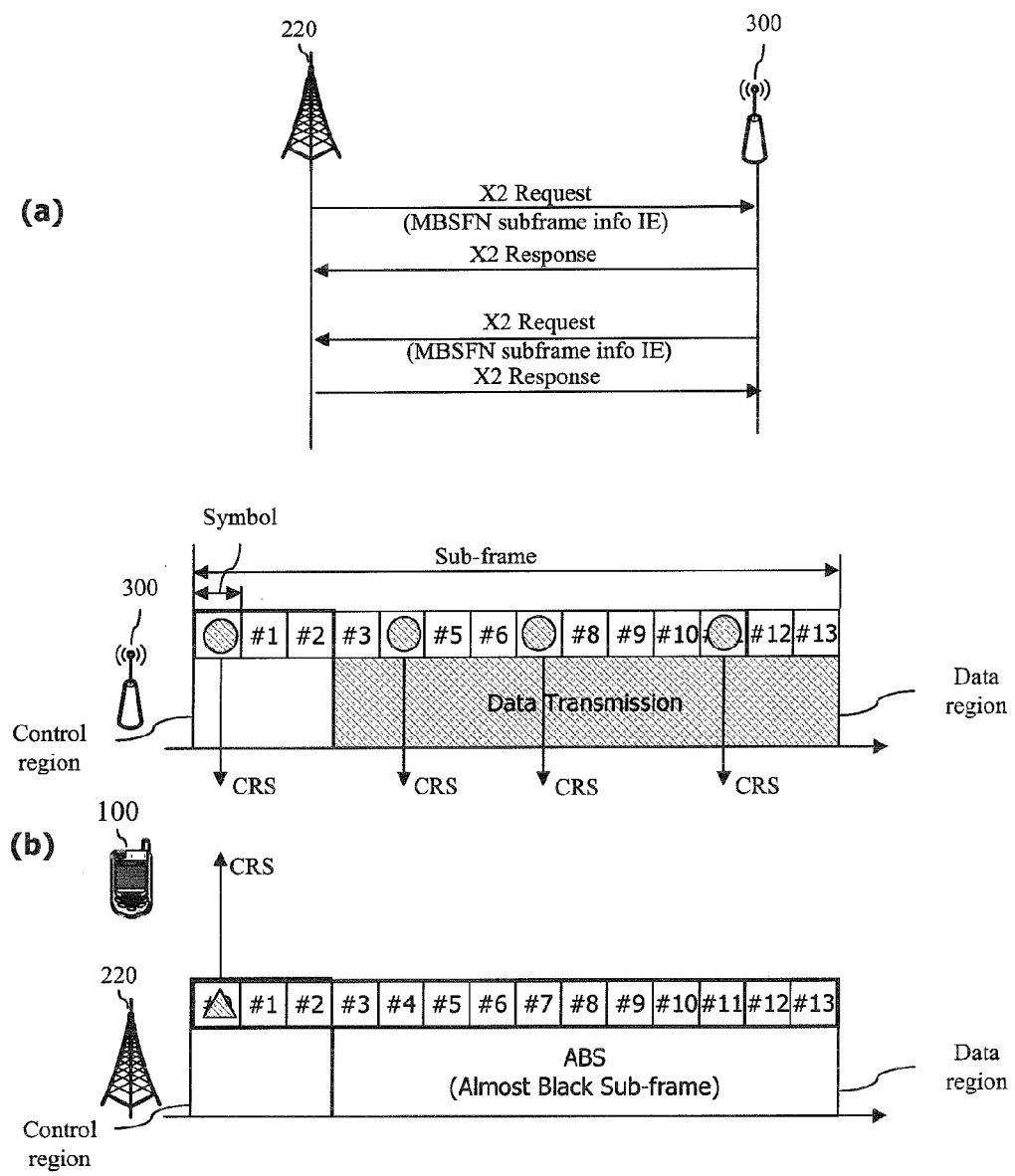
FIG. 13 is an exemplary diagram illustrating enhanced inter-cell interference coordination (eICIC) for solving inter-base station interference.

FIG. 13 is an exemplary diagram illustrating enhanced inter-cell interference coordination (eICIC) for solving inter-base station interference.

As can be seen with reference to FIG. 13(*a*), the macro cell, i.e., the eNodeB 220, and the pico cell 300 exchange information on the MBSFN subframe with each other through an X2 interface.

For example, the macro cell, i.e., the eNodeB 220 allows the information on the MBSFN subframe and information on a subframe operating as the ABS to be included in an MBSFN subframe info IE, and transmits the MBSFN subframe info IE through an X2 interface-based request message.

Meanwhile, the pico cell 300 also allows the information on the MBSFN subframe and the information on the subframe operating as the ABS to be included in the MBSFN subframe info IE, and transmits the MBSFN subframe info IE through the X2 interface-based request message.

As such, the macro cell, i.e., the eNodeB 220, and the pico cell 300 can exchange the information on the MBSFN subframe with each other through the X2 interface.

However, the macro cell, i.e., the eNodeB 220, and the femto cell 300 have no X2 interface. To obtain information on the MBSFN of the macro cell, i.e., the eNodeB 220, the femto cell 300 may obtain system information broadcasted by wireless from the macro cell, i.e., the eNodeB 220, thereby obtaining the information on the MBSFN subframe. Alternatively, the femto cell 300 may obtain the information on the MBSFN subframe of the macro cell, i.e., the eNodeB 200 from a control station of the core network.

Alternatively, if the information on the MBSFN subframe of the macro cell, i.e., the eNodeB 220 is determined, the information on the MBSFN subframe may be applied to the femto cell 300 through operations and management (OAM).

Referring to FIG. 13(*b*), a subframe configured as the MBSFN by the pico cell 300 is shown. The pico cell 300 configures the corresponding subframe as the MBSFN and informs the macro cell, i.e., the eNodeB 220 of the corresponding subframe through the X2 interface. Then, the macro cell, i.e., the eNodeB 220 operates the corresponding subframe as the ABS.

The pico cell 300 performs data transmission in the data region of the corresponding subframe, and the CRS is transmitted on zeroth, fourth, seventh and eleventh symbols.

On the other hand, if the eICIC is applied to the macro cell, i.e., the eNodeB 220, the macro cell, i.e., the eNodeB 220 does not any data in the data region of the corresponding subframe, thereby preventing interference. However, the macro cell, i.e., the eNodeB 220 transmits only the CRS of the corresponding subframe.

The UE measures reference signal received power (RSRP) and reference signal received quality (RSRQ) using CRSs respectively received from the macro cell, i.e., the eNodeB 220, and the pico cell 300. As a specific example, when a serving cell of the UE 100 corresponds to macro cell and the pico cell 300 corresponds to a neighboring cell, the UE 100 measures the RSRP and RSRQ of the serving cell through the CRS from the macro cell, i.e., the eNodeB 220, and measures the RSRP and RSRQ of the neighboring cell through the CRS from the pico cell 300.

In the current 3GPP LTE/LET-A standard, the CRS exists on the zeroth, fourth, seventh and eleventh OFDM symbols in each subframe on the time axis. For the purpose of compatibility with an LTE UE, the eICIC of the LTE-A does not applies a separate subframe but uses an ABS in which data of the other portions except a minimum signal necessary for the operation of the UE, including the CRS, is not allocated. In the MBSFN ABS subframe, the other CRSs except the first CRS are additionally removed, so that the interference between the CRSs can be excluded in fourth, seventh and eleventh OFDM symbol periods including the other CRSs except the first CRS.

FIG. 14A to 14D are exemplary diagrams illustrating subframes operating as ABSs.

Figure 14A:
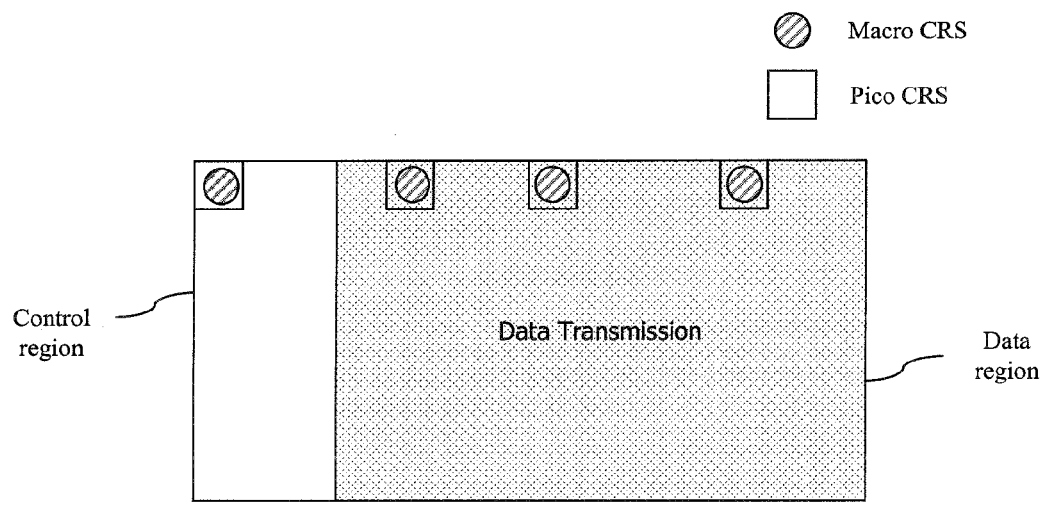
FIG. 14A to 14D are exemplary diagrams illustrating subframes operating as almost blank subframes (ABSs)

Referring to FIG. 14A, a relation between macro and pico cells in a subframe operating as a non-MBSFN, i.e., a general subframe is shown. The macro cell transmits data in a data region of the corresponding subframe, and transmits CRSs through zeroth, fourth, seventh and eleventh symbols. If the macro cell transmits the CRS through the same symbol, the CRSs collide with each other, and therefore, the interference between the CRSs occurs.

Figure 14B:
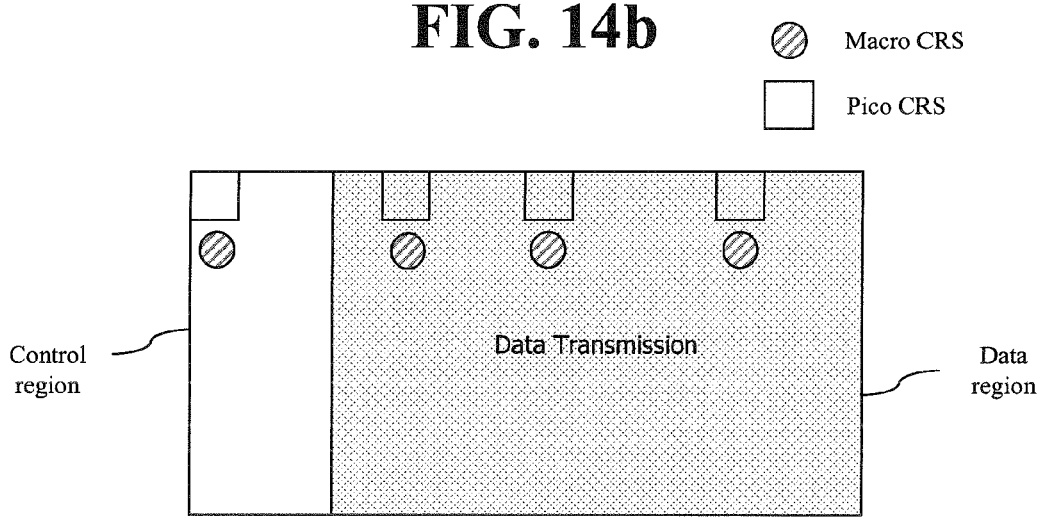

Referring to FIG. 14B, a relation between macro and pico cells in a subframe operating as a non-MBSFN, i.e., a general subframe is shown. The macro cell transmits data in a data region of the corresponding subframe, and transmits CRSs through zeroth, fourth, seventh and eleventh symbols. If the macro cell transmits the CRSs through the zeroth, fourth, seventh and eleventh symbols using different resources, it is possible to avoid the collision between the CRSs.

Figure 14C:
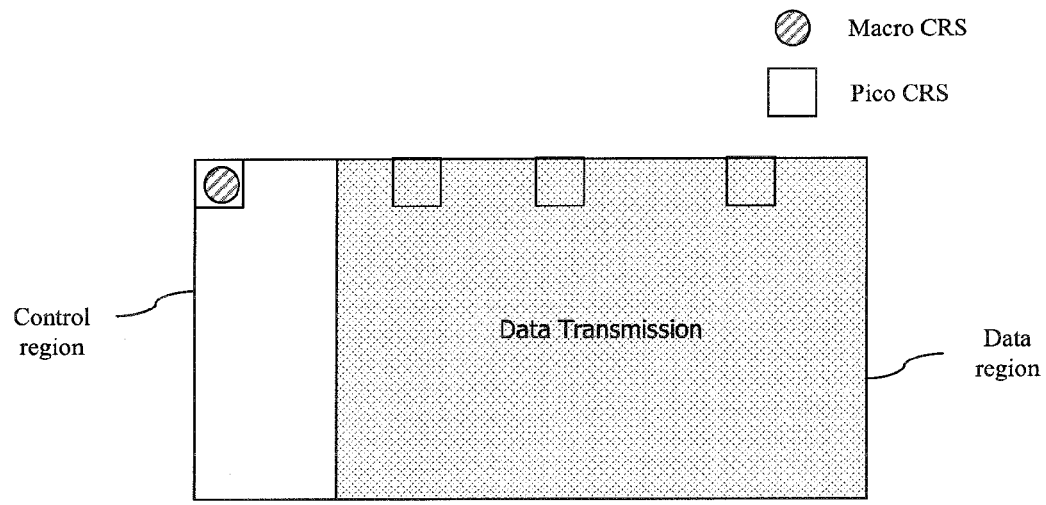

Referring to FIG. 14C, a relation between macro and pico cells on a subframe configured as an MBSFN by the pico cell 300. The pico cell 300 transmits data in a data region of the subframe configured as the MBSFN. The pico cell 300 transmits CRSs through zeroth, fourth, seventh and eleventh symbols in the control region of the subframe. On the other hand, if the eICIC is applied to the macro cell 220, the macro cell 220 does not transmit the data in the data region. However, the macro cell 220 CRSs through the zeroth symbol on the subframe. That is, In an MBSFN ABS subframe, the other CRSs except the first CRS are additionally removed, so that the interference between the CRSs can be excluded in fourth, seventh and eleventh OFDM symbol periods including the other CRSs except the first CRS. Accordingly, only the CRSs transmitted through the zeroth symbol collide with each other, and therefore, the interference between the CRSs occurs.

Figure 14D:
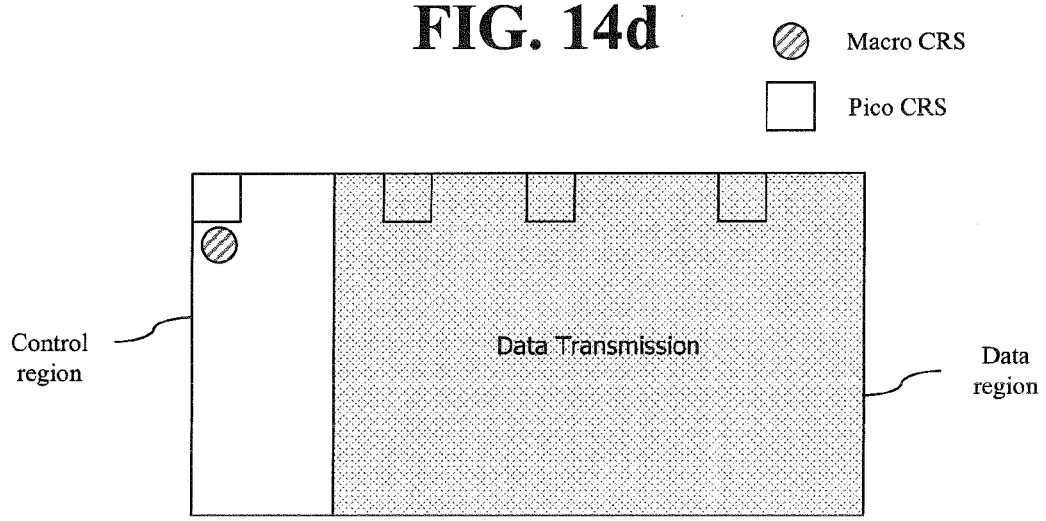

Referring to FIG. 14D, a relation between macro and pico cells on a subframe configured as an MBSFN by the pico cell 300. The pico cell 300 transmits data in a data region of the subframe configured as the MBSFN. The pico cell 300 transmits CRSs through zeroth, fourth, seventh and eleventh symbols in the control region of the subframe. On the other hand, if the eICIC is applied to the macro cell 220, the macro cell 220 does not transmit the data in the data region. However, the macro cell 220 CRSs through the zeroth symbol on the subframe. If the pico cell 300 transmits the CRSs through the zeroth symbol using different resources, it is possible to avoid the collision between the CRSs.

As described above, when the UE measures RSRP/RSRQ by receiving the CRSs from the pico cell 300 under the situation in which the macro cell 220 and the pico cell 300 coexist, FIG. 14A illustrates a case in which the positions of the CRSs of the macro and pico cells are the same as each other. Therefore, the overlapped CRSs act as the interference between the CRSs, and accordingly, the transmission performance of a signal is remarkably lowered.

Figure 15:
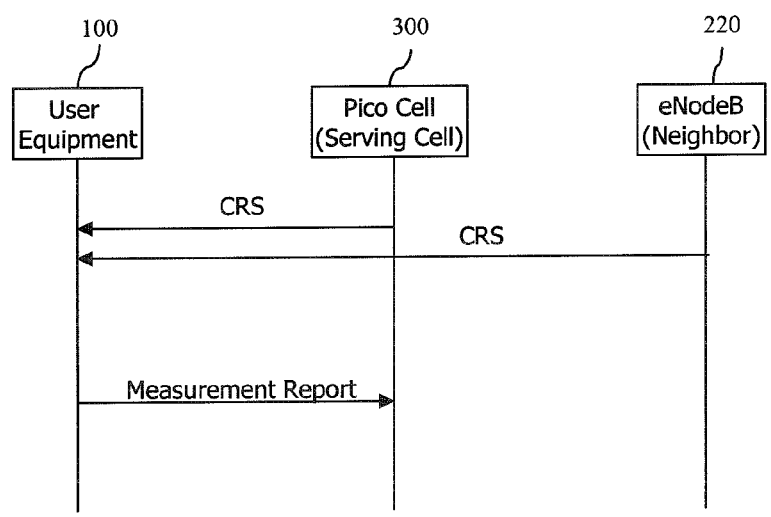
FIG. 15 illustrates a process of measuring reference signal received power (RSRP) and reference signal received quality (RSRQ) through a cell-specific RS (CRS)

FIG. 15 illustrates a process of measuring RSRP and RSRQ through a CRS.

As can be seen with reference to FIG. 15, when the pico cell 300 is a serving cell and the macro cell, i.e., the eNodeB 220 is a neighboring cell with respect to the UE 100, the serving cell and the neighboring cell transmit CRSs, respectively. Then, the UE 100 measures the RSRP and RSRQ through the CRSs, and transmits the measured result to the pico cell 300 that is the serving cell.

Hereinafter, the serving cell transmits necessary information to the UE so as to perform measurement will be described.

Figure 16:
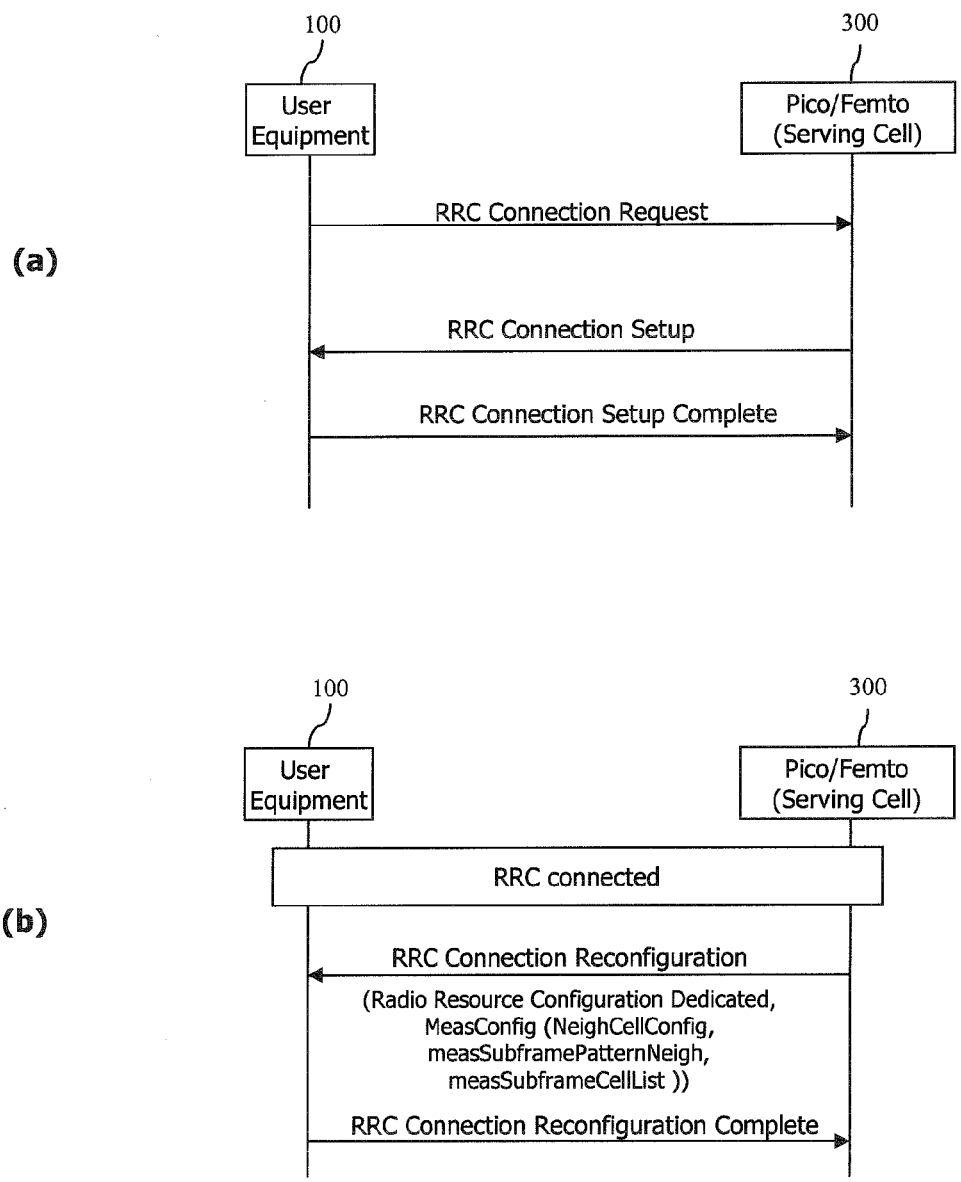
FIG. 16 illustrates a process of providing a user equipment (UE) with information for cell measurement.
Figure 17:
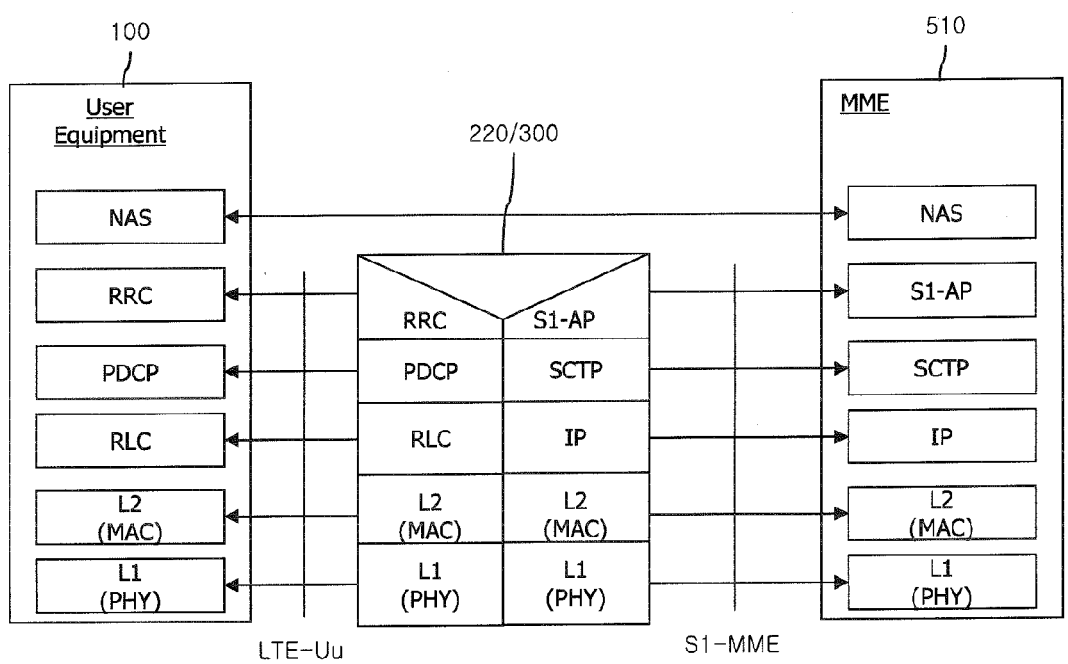
FIG. 17 illustrates control plane and user plane architectures of a radio interface protocol between an UE and an evolved-universal terrestrial radio access network (E-UTRAN) based on a 3GPP radio access network standard.
Figure 18:
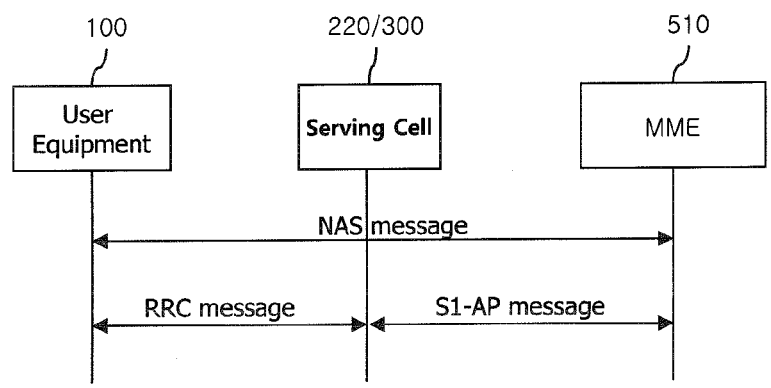
FIG. 18 illustrates messages transmitted/received based on the architecture of the protocol shown in FIG. 17.

FIG. 16 illustrates a process of providing a UE with information for cell measurement. FIG. 17 illustrates control plane and user plane architectures of a radio interface protocol between an UE and an evolved-universal terrestrial radio access network (E-UTRAN) based on a 3GPP radio access network standard. FIG. 18 illustrates messages transmitted/received based on the architecture of the protocol shown in FIG. 17.

As can be seen with reference to FIG. 16(*a*), the UE 100 establishes an RRC connection procedure with the pico/femto cell 300 that is a serving cell.

Before describing RRC, the architecture of the protocol among the UE 100, the serving cell 220 or 300 and the MME 510 will be described with reference to FIG. 17.

The protocol among the UE 100, the serving cell 220 or 300 and the MME 510 may be divided into a control plane and a user plane. The control plane means a gateway through which control messages used for the UE and network to manage a call are transmitted. The user plane means a gateway through which data generated in an application layer, e.g., voice data, Internet packet data, etc. is transmitted.

A physical layer as a first layer provides an information transfer service to an upper layer using a physical channel. The physical layer is connected to a medium access (MAC) control layer above the physical layer via a transport channel. Data is transferred between the MAC layer and the physical layer via the transport channel. Data are transferred between one physical layer of a transmitting side and the other physical layer of a receiving side via the physical channel. The physical channel uses time and frequency as radio resources. Specifically, the physical channel is modulated using an orthogonal frequency division multiple access (OFDMA)

scheme in a downlink, and is modulated using a single carrier frequency division multiple access (SC-FDMA) scheme in an uplink.

The MAC layer of a second layer provides a service to a radio link control (RLC) layer above the MAC layer via a logical channel. The RLC layer of the second layer supports reliable data transfer. The RLC layer may be implemented as a functional block inside the MAC layer. To effectively transmit IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on a lowest portion of a third layer is defined in only the control plane. The RRC layer is associated with configuration, re-configuration and release of radio bearers RBs) to be in charge of controlling the logical, transport and physical channels. The RB means a service provided by the second layer for the data transfer between the UE and the network. To this end, the RRC layers of the UE and the network exchange RRC messages with each other. If the RRC layer of the UE is RRC connected to the RRC layer of the network, the UE is in RRC connected mode. If not so, the UE is in RRC idle mode. A non-access stratum (NAS) layer located above the RRC layer performs functions such as session management and mobility management.

Meanwhile, as can be seen with reference to FIG. 18, the messages transmitted/received between the UE 100 and the serving cell, e.g., the eNodeB 220 or pico/femto cell 300 are messages based on an RRC protocol. The messages transmitted/received between the serving cell 220 or 300 and the MME 510 are messages based on an S1 application protocol (S1-AP).

The messages transmitted/received between the UE 100 and the MME 510 are messages based on a NAS protocol. The messages based on the NAS protocol are encapsulated in a message based on the RRC protocol and the S1-AP message and then transmitted.

Hereinafter, an RRC state of a UE and an RRC connection will be described.

The RRC state refers to whether or not the RRC layer is in a logical connection with the RRC layer of the E-UTRAN. When the RRC layers are logically connected to each other, the RRC state is called as an RRC_CONNECTED state. When the RRC layers are not logically connected to each other, the RRC state is called as RRC_IDLE state. Since an RRC connection exists in the UE of the RRC_CONNECTED state, the E-UTRAN can recognize the existence of the corresponding UE in the cell unit, and thus can effectively control the UE. On the other hand, the E-UTRAN cannot recognize the UE of the RRC_IDLE state, and the core network manages the UE in tracking area units, which correspond to area units larger than the cell units. That is, the UE in the RRC_IDLE state is recognized only in large area units, and the RRC is necessarily shifted to the RRC_CONNECTED state in order to receive general mobile communication services such as sound or data.

When a user initially turns on the power of the UE, the UE searches for an adequate cell and then remains in the RRC_IDLE state within the corresponding cell. When the UE in the RRC Idle state is required to make an RRC connection, the RRC of the UE can make an RRC connection with the RRC of the E-UTRAN through an RRC connection procedure, thereby shifting to the RRC_CONNECTED state. There are various cases in which the UE in the RRC_IDLE state is required to make an RRC connection. For example, there is a case in which an uplink data transmission is required due to reasons such as the user's attempt to make a phone call, or a case in which a response message transmission is required to be made after receiving a paging message from the E-UTRAN.

As such, the UE 100 performs the RRC connection procedure so as to shift to the RRC_Connected state, i.e., the RRC connection state. As shown in FIG. 16(*a*), the UE 100 transmits an RRC connection request message to the serving cell, i.e., the pico/femto cell 300.

If the UE 100 receives an RRC connection setup message from the serving cell in response to the RRC connection request message, the UE 100 transmits an RRC connection setup complete message to the serving cell.

Meanwhile, when it is required to reconfigure the RRC connection after shifting to the RRC connection state, as shown in FIG. 16(*b*), the serving cell, i.e., the pico/femto cell 300 transmits an RRC connection reconfiguration message to the UE 100.

The RRC reconfiguration message may include, for example, a radio resource configuration dedicated information element (IE) and a measurement configuration (MeasConfig). Table 1 shows information included in the RRC reconfiguration message as shown in this figure.

TABLE 1 measConfig
mobillityControlInfo
dedicatedInfoNASList
radioResourceConfigDedicated
securityConfigH0
nonCriticalExtension As such, the radio resource configuration dedicated IE, the measurement configuration (MeasConfig), etc. are included in the RRC reconfiguration message.

The radio resource configuration dedicated IE is used to configure/modify/cancel radio bearers, to modify MAC configuration, etc. The radio resource configuration dedicated IE includes subframe pattern information. The subframe pattern information is information on a measurement resource restriction pattern on the time domain, for measuring RSRP and RSRQ of a primary cell (PCell).

The radio resource configuration dedicated IE includes fields as shown in the following table.

TABLE 2

RadioResourceConfigDedicated
measSubframePatternPCell-r10

The RadioResourceConfigDedicated field includes factors as shown in the following table.

TABLE 3

RadioResourceConfigDedicated field descriptions logicalChannelConfig
is used as a selection for indicating that the logical channel configuration for SRBs( ) is clearly signaled or that the logical channel configuration is set to a default logical channel configuration for SRB1
logicalChannelIdentity
is a logical channel identifier for identifying both uplink (UL) and downlink (DL)
mac-MainConfig
is a selection used to indicate that the mac-MainConfig is clearly signaled or that the mac-MainConfig is set to default main configuration
measSubframePatternPCell TABLE 3-continued RadioResourceConfigDedicated field descriptions is a time domain measurement resource restriction pattern for measuring
RSRP and RSRQ of a primary cell (PCell, i.e., serving cell)
physicalConfigDedicated
is default dedicated physical configuration As described above, measSubframePatternPCell or meas-SubframePattern-Serv indicating the time domain measurement resource restriction pattern for measuring the RSRP and RSRQ of the primary cell (PCell, i.e., serving cell) is included in the RadioResourceConfigDedicated field within the RRC reconfiguration message.

Meanwhile, the measurement configuration (MeasConfig) includes an IE as shown in the following table.

TABLE 4

MeasConfig ::=
-- Measurement objects
    measObjectToRemoveList
    measObjectToAddMoList The measObjectToRemoveList indicating a list of measObject to be removed and measObjectToAddModList indicating a list to be newly added or modified are included in the measurement objects IE.

MeasObjectCDMA2000, MeasObjectEUTRA, MeasObjectGERAN, etc. are included in the measObject according to a communication technology.

Meanwhile, the MeasObjectEUTRA IE includes information applied for the purpose of an intra-frequency or inter-frequency for E-UTRA cell measurement. The MeasObjectEUTRA IE is as shown in the following table.

TABLE 5

1) MeasObjectEUTRA
- neighCellConfig
-    measSubframePatternConfigNeigh-r10
2) MeasSubframePatternConfigNeigh-r10
    measSubframePattern-Neigh-r10
    measSubframeCellList-r10

The MeasObjectEUTRA is more specifically described as follows.

TABLE 6

Description of MeasObjectEUTRA field carrierFreq
identifies an E-UTRA carrier frequency effective in the configuration
neighCellConfig
indicates configuration information of a neighboring cell
measCycleSCell
Parameter: Tmeasure_SCC
is used when a secondary cell (SCell) operates at a frequency indicated
in the measObject and is in a non-activated state
measSubframeCellList
is a list of cells to which the measSubframePattern-Neigh is applied.
If a cell is not included in the measSubframeCellList, a time
domain measurement resource restriction pattern for all neighboring
cells is applied to the UE
measSubframePattern-Neigh
is a time domain measurement resource restriction pattern applied in
measuring RSRP and RSRQ of a neighboring cell on the carrier
frequency indicated in the carrierFreq As described above, the MeasObjectEUTRA includes a configuration information of a neighboring cell (i.e., NeighCellConfig), a time domain measurement resource restriction pattern (i.e., measSubframePattern-Neigh) applied in measuring RSRP and RSRQ of the neighboring cell, and a cell list (i.e., measSubframeCellList) to which the pattern is applied.

The time domain measurement resource restriction pattern configured for the measured cell indicates at least one subframe per radio frame, used for performing measurement.

The measurement must not be performed in any subframe different from that indicated by the time domain measurement resource restriction pattern for configured for the measured cell.

The configuration information of the neighboring cell (i.e., NeighCellConfig) includes information related to the MBSFN of the neighboring cell and information related to TDD UL/DL configuration.

TABLE 7

Description of NeighCellConfig field neighCellConfig
: is used to provide information related to the MBSFN of the neighboring
cell and information related to TDD UL/DL configuration
00: Although all neighboring cells are not applied at a specific frequency,
some of the neighboring cells have the same MBSFN subframe
allocation configuration as the serving cell.
10: All the neighboring cells have the same MBSFN subframe allocation
configuration as the serving cell at the specific frequency.
01: All the neighboring cells do not have MBSFN subframe configuration.
11: When comparing the neighboring cell with the serving cell at the
specific frequency, the neighboring cell has a different UL/DL
configuration from the serving cell.

Figure 19:
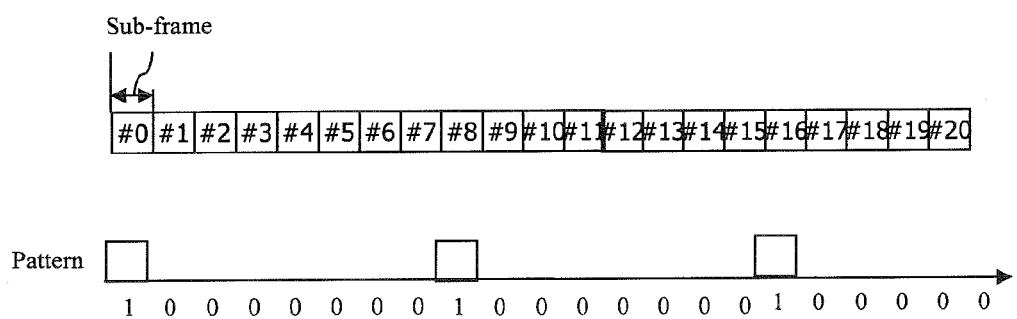
FIG. 19 illustrates an example of a time domain measurement resource restriction pattern.

FIG. 19 illustrates an example of a time domain measurement resource restriction pattern.

As can be seen with reference to FIG. 19(a), the time domain measurement resource restriction pattern (i.e., measSubframePatternPCell or measSubframePattern-Neigh) may be a subframe to which restriction is applied or a subframe to which restriction is not applied, when the UE 100 performs measurement. In this case, the subframe used to perform the measurement by applying the restriction may be represented as 1, and the subframe used to perform the measurement by not applying the restriction may be represented as 0.

Figure 20:
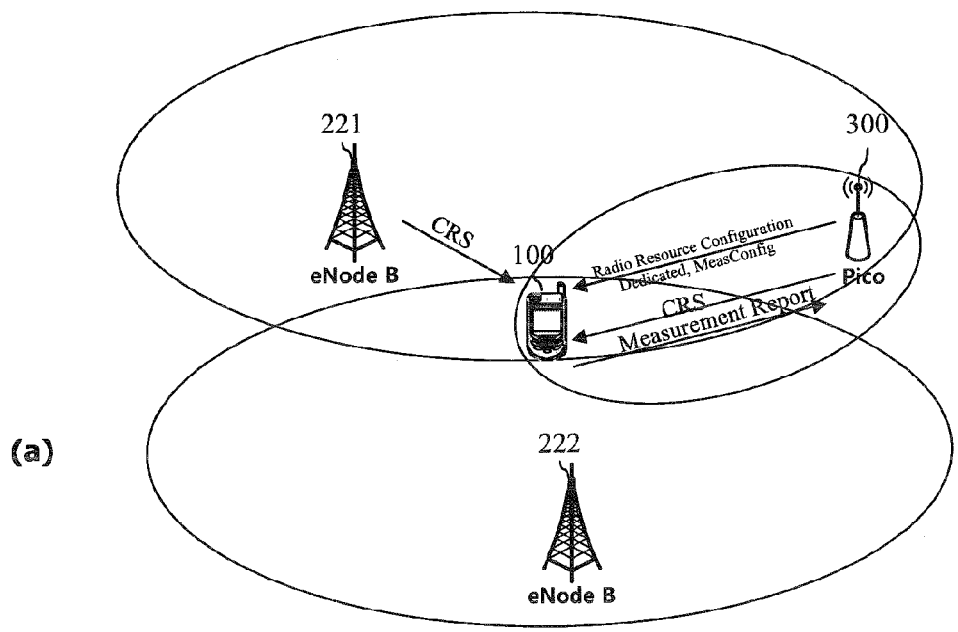
FIG. 20 is an exemplary diagram illustrating a process of measuring RSRP and RSRQ.
Figure 20:
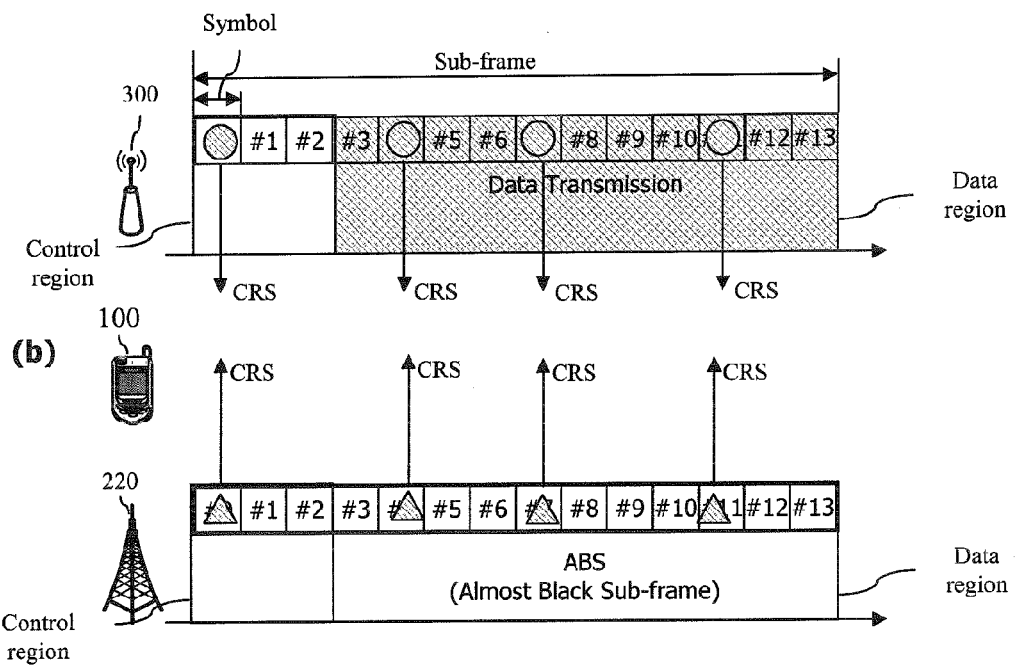

FIG. 20 is an exemplary diagram illustrating a process of measuring RSRP and RSRQ.

Referring to FIG. 20(a), the UE 100 exists within the coverage of a pico cell 300 and the coverage of a first macro cell (eNodeB) 221 and a second macro cell (eNodeB) 222. In this case, the pico cell 300 is a serving cell, and the first and second macro cells (eNodeBs) 221 and 222 are neighboring cells.

In this situation, a subframe that the pico cell 300 configures as an MBSFN is shown in FIG. 20(b). If the pico cell 300 configures the corresponding subframe as the MBSFN and informs the first and second macro cells (eNodeBs) 221 and 222 of the configuration through the X2 interface, the first and second macro cells 221 and 222 operate the corresponding subframe as an ABS.

The pico cell 300 performs data transmission in the data region of the corresponding subframe, and transmits CRSs in the control and data regions. The CRSs are transmitted on zeroth, fourth, seventh and eleventh symbols. On the other hand, since the first and second macro cells 221 and 222 operate the corresponding subframe as the ABS, any data is not transmitted in the data region, thereby preventing interference between the CRSs. However, the first and second macro cells 221 and 222 transmit CRSs on the zeroth, fourth, seventh and eleventh symbols or the zeroth symbol according to the non-MBSFN ABS and MBSFN ABS.

Meanwhile, the UE 100 receives, as described above, the radio resource configuration dedicated IE and the measurement configuration (MeasConfig) from the pico cell 300.

In this case, the radio resource configuration dedicated IE includes the measSubframePattern-Serv as described above. As described above, the measurement configuration (MeasConfig) the neighCellConfig indicating the configuration information of the neighboring cell, the measSubframePattern-Neigh indicating the time domain measurement resource restriction pattern applied in measuring the RSRP and RSRQ of the neighboring cell and the measSubframeCellList indicating the list of the cells to which the measSubframePattern-Neigh is applied.

First, the UE 100 identifies the measSubframePattern-Serv so as to perform measurement for the serving cell, i.e., the pico cell 300. If it is identified by the measSubframePattern-Serv that the received subframe is a subframe to which the restriction pattern is applied, the UE 100 performs measurement by receiving CRSs on the zeroth, fourth, seventh and eleventh symbols of the subframe received from the serving cell, i.e., the pico cell 300.

Meanwhile, the UE 100 identifies the measurement configuration (MeasConfig) so as to measure the neighboring cells, i.e., the first and second macro cells 221 and 222. It is assumed that the subframe shown in FIG. 20(b) by the measSubframePattern-Neigh in the measurement configuration (MeasConfig) is a subframe to which the restriction is applied in performing the measurement of the neighboring cell and the cells to which the restriction is applied by the measSubframeCellList are known as the first and second macro cells 221 and 222.

As such, when the subframe shown in FIG. 20(b) by the measSubframePattern-Serv and the measSubframePattern-Neigh is a subframe to be measured, the UE 100 receives CRSs from the serving cell, i.e., the pico cell 300, and receives CRSs from the neighboring cells, i.e., the first and second macro cells 221 and 222, thereby performing the measurement.

In this case, the subframe is operated as the ABS by the neighboring cells, i.e., the first and second macro cells 221 and 222, and therefore, any data is not received in the data region.

When the RSRP and RSRQ are measured, the RSRQ depends on a signal-to-interference plus noise ratio (SINR). That is, the RSRQ is defined as (NxSRP)/received signal strength indicator (RSSI). Here, N denotes a number of RBs in an RSSI measurement band, and RSSI denotes a strength of the received signal. That is, the RSRQ means the strength of an actual reference signal by removing interference and noise from the received signal.

When the subframe shown in FIG. 20(b) is operated as the ABS by the neighboring cells, i.e., the first and second macro cells 221 and 222, and therefore, any data is not transmitted in the data region, the RSRQs of the serving cell and the neighboring cell are measured almost identical to each other, and it cannot be determined which one of the serving cell and the neighboring cell has RSRQ superior to the other. As a result, the UE cannot correctly perform cell selection or cell reselection.

When the subframes restricted by the measSubframePattern-Serve and the measSubframePattern-Neigh are set identical to each other, there is a serious limitation in performing the cell selection or cell reselection through RSRP and RSRQ.

Hereinafter, the accuracy required to measure RSRP and RSRQ will be described.

The accuracy of the RSRP may be divided into absolute accuracy and relative accuracy. The absolute accuracy and the relative accuracy will be described in detail as follows.

First, the absolute accuracy will be described. When a time domain measurement resource pattern is applied, the absolute accuracy of the RSRP is required to measure a cell operating at the same frequency as the serving cell.

If it is assumed that CRSs in the measured cell are transmitted from one, two or four antenna ports, the required absolute accuracy is as follows.

$RSRP|_{dBm} \geq -127$ dBm with respect to bands 1, 4, 6, 10, 11, 18, 19, 21, 24, 33, 34, 35, 36, 37, 38, 39, 40, 42 and 43

$RSRP|_{dBm} \geq -126$ dBm with respect to bands 9 and 41

$RSRP|_{dBm} \geq -125$ dBm with respect to bands 2, 5 and 7

$RSRP|_{dBm} \geq -124$ dBm with respect to bands 3, 8, 12, 13, 14, 17 and 20

These are shown in the following Table 8.

TABLE 8

| | | Accuracy [dB] | | Condition | | | |
|---|---|---|---|---|---|---|---|
| Parameter | Unit | General condition | Maximum condition | Bands 1, 4, 6, 10, 11, 18, 19, 21, 24, 33, 34, 35, 36, 37, 38, 39, 40, 42 and 43 Io | Bands 2, 5 and 7 Io | Bands 3, 8, 12, 13, 14, 17 and 20 Io | Bands 9 and 41 Io |
| RSRP for $Es/I_{ot} \geq$ [−4] dB | dBm | ±6 | ±9 | 121 dBm/ 15 kHz . . . −70 dBm/ $BW_{Channel}$ | 119 dBm/ 15 kHz . . . −70 dBm/ $BW_{Channel}$ | 118 dBm/ 15 kHz . . . −70 dBm/ $BW_{Channel}$ | 120 dBm/ 15 kHz . . . −70 dBm/ $BW_{Channel}$ |
| RSRP for $Es/I_{ot} \geq$ [−4] dB | dBm | ±9 | ±11 | −70 dBm/ $BW_{Channel}$ . . . −50 dBm/ $BW_{Channel}$ | −70 dBm/ $BW_{Channel}$ . . . −50 dBm/ $BW_{Channel}$ | −70 dBm/ $BW_{Channel}$ . . . −50 dBm/ $BW_{Channel}$ | −70 dBm/ $BW_{Channel}$ . . . −50 dBm/ $BW_{Channel}$ |

Io is defined with respect to REs in the subframe indicated by the time domain measurement resource restriction pattern applied in measuring the RSRP of the measured cell.

Meanwhile, when the time domain measurement resource pattern is applied, the relative accuracy of the RSRP is also required to measure a cell operating at the same frequency as the serving cell.

If it is assumed that CRSs in the measured cell are transmitted from one, two or four antenna ports, the required relative accuracy is as follows.

$RSRP1,2|_{dBm} \geq -127$ dBm with respect to bands 1, 4, 6, 10, 11, 18, 19, 21, 24, 33, 34, 35, 36, 37, 38, 39, 40, 42 and 43

$RSRP1,2|_{dBm} \geq -126$ dBm with respect to bands 9 and 41
$RSRP1,2|_{dBm} \geq -125$ dBm with respect to bands 2, 5 and 7
$RSRP1,2|_{dBm} \geq -124$ dBm with respect to bands 3, 8, 12, 13, 14, 17 and 20

Here, dBm is a unit of electric power (Watt), and 1 mW=0 dBm.

These are shown in the following Table 9.

TABLE 9

| Parameter | Unit | Accuracy [dB] General condition | Accuracy [dB] Maximum condition | Condition Bands 1, 4, 6, 10, 11, 18, 19, 21, 24, 33, 34, 35, 36, 37, 38, 39, 40, 42 and 43 Io | Bands 2, 5 and 7 Io | Bands 3, 8, 12, 13, 14, 17 and 20 Io | Bands 9 and 41 Io |
|---|---|---|---|---|---|---|---|
| RSRP for $Es/I_{ot} \geq$ [−4] dB | dBm | ±2 | ±3 | −121 dBm/ 15 kHz ... −50 dBm/ $BW_{Channel}$ | −119 dBm/ 15 kHz ... −50 dBm/ $BW_{Channel}$ | −118 dBm/ 15 kHz ... −50 dBm/ $BW_{Channel}$ | −120 dBm/ 15 kHz ... −50 dBm/ $BW_{Channel}$ |
| RSRP for $Es/I_{ot} \geq$ [−4] dB | dBm | ±3 | ±3 | −121 dBm/ 15 kHz ... −50 dBm/ $BW_{Channel}$ | −119 dBm/ 15 kHz ... −50 dBm/ $BW_{Channel}$ | −118 dBm/ 15 kHz ... −50 dBm/ $BW_{Channel}$ | −120 dBm/ 15 kHz ... −50 dBm/ $BW_{Channel}$ |

Hereinafter, the accuracy of the RSRQ will be described.

When a time domain measurement resource pattern is applied, the absolute accuracy of the RSRQ is also required to measure a cell operating at the same frequency as the serving cell.

If it is assumed that CRSs in the measured cell are transmitted from one, two or four antenna ports, the required absolute accuracy is as follows.

$RSRQ|_{dBm} \geq -127$ dBm with respect to bands 1, 4, 6, 10, 11, 18, 19, 21, 24, 33, 34, 35, 36, 37, 38, 39, 40, 42 and 43
$RSRQ|_{dBm} \geq -126$ dBm with respect to bands 9 and 41
$RSRQ|_{dBm} \geq -125$ dBm with respect to bands 2, 5 and 7
$RSRQ|_{dBm} \geq -124$ dBm with respect to bands 3, 8, 12, 13, 14, 17 and 20

These are shown in the following Table 10.

Figure 21:
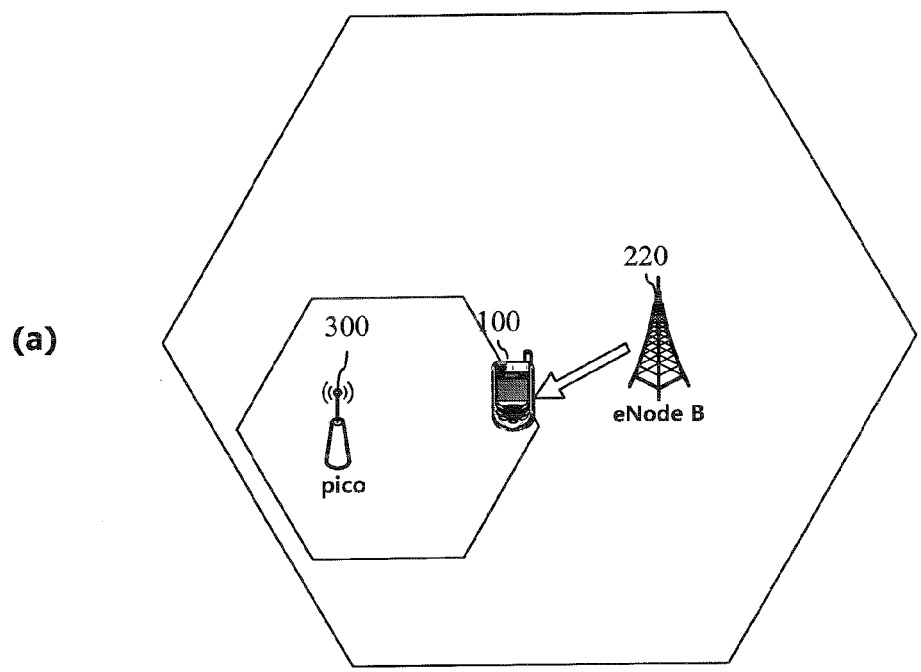
FIG. 21 is an exemplary diagram illustrating a situation in which a UE exists within a coverage of a pico cell and a coverage of a macro cell (eNodeB)
Figure 21:
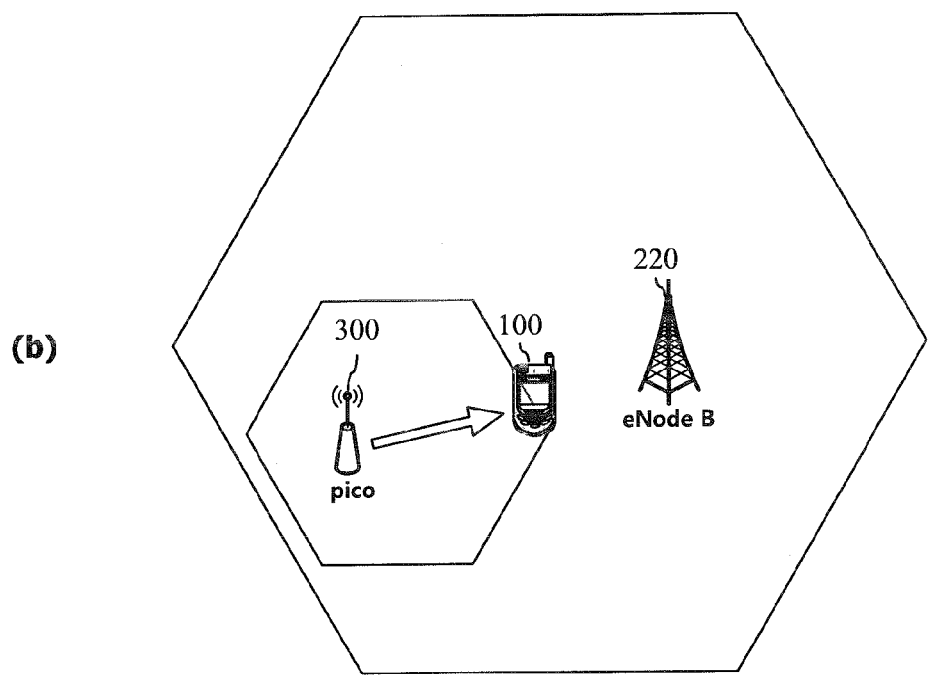

FIG. 21 is an exemplary diagram illustrating a situation in which a UE exists within a coverage of the pico cell 300 and a coverage of the macro cell (eNodeB) 220.

As can be seen with reference to FIG. 21, when the macro cell 220 operates a specific subframe as the ABS under a situation in which the macro cell and the pico cell coexist, the UE 100 performs cell selection or cell reselection by measuring the signal strength and quality of each cell in the corresponding specific subframe.

In this case, two scenarios may exist. A first scenario is a case in which the macro cell 200 is a serving cell and the pico cell 300 is a neighboring cell. A second scenario is a case in which the pico cell 300 is a serving cell and the macro cell is a neighboring cell.

First, the first scenario is shown in FIG. 21(a). As shown in FIG. 21(a), the UE 100 is under communication with the macro cell 220 that is a serving cell, and measures RSRP and RSRQ by receiving CRSs from the macro cell 220 and the pico cell 300 while moving toward the macro cell 220. Accordingly, the UE 100 finally performs selection or reselection of the pico cell 300.

TABLE 10

| Parameter | Unit | Accuracy [dB] General condition | Accuracy [dB] Maximum condition | Condition Bands 1, 4, 6, 10, 11, 18, 19, 21, 24, 33, 34, 35, 36, 37, 38, 39, 40, 42 and 43 Io | Bands 2, 5 and 7 Io | Bands 3, 8, 12, 13, 14, 17 and 20 Io | Bands 9 and 41 Io |
|---|---|---|---|---|---|---|---|
| RSRQ when RSRP $Es/I_{ot} =$ [TBD] dB | dBm | ±2.5 | ±4 | −121 dBm/ 15 kHz ... −50 dBm/ $BW_{Channel}$ | −119 dBm/ 15 kHz ... −50 dBm/ $BW_{Channel}$ | −118 dBm/ 15 kHz ... −50 dBm/ $BW_{Channel}$ | −120 dBm/ 15 kHz ... −50 dBm/ $BW_{Channel}$ |
| RSRQ when RSRP $Es/I_{ot} =$ [−4] dB | dBm | ±3.5 | ±4 | −121 dBm/ 15 kHz ... −50 dBm/ $BW_{Channel}$ | −119 dBm/ 15 kHz ... −50 dBm/ $BW_{Channel}$ | −118 dBm/ 15 kHz ... −50 dBm/ $BW_{Channel}$ | −120 dBm/ 15 kHz ... −50 dBm/ $BW_{Channel}$ |

As described above, the UE necessarily measures the RSRQ in only the subframe indicated by the measSubframePattern-Serv and the measSubframePattern-Neigh. Although the RSRP may be measured in another subframe, the measurement is generally performed on only the indicated subframe for the purpose of actual requirements.

Next, the second scenario is shown in FIG. 21(b). As shown in FIG. 21(b), the UE 100 is under communication with the pico cell 300 that is a serving cell, and measures RSRP and RSRQ by receiving CRSs from the macro cell 220 and the pico cell 300 while moving the macro cell 220. Accordingly, the UE 100 finally performs selection or reselection of the macro cell 220.

As described above, when the subframe indicated by the measSubframePattern-Serv and the measSubframePattern-Neigh is set to the ABS by the macro cell 220, and therefore, any data is not received, the RSRQs of the serving cell and the neighboring cell are measured almost identical to each other, and it cannot be determined which one of the serving cell and the neighboring cell has RSRQ superior to the other. As a result, the UE cannot correctly perform cell selection or cell reselection.

Although the UE measures an actual RSRP/RSRQ of the macro cell 220 in a subframe set to the ABS by the macro cell 200, an actual service is not performed in the period of the corresponding subframe. Hence, it is meaningless that the UE performs cell selection or cell reselection.

Hereinafter, a method in which a serving cell and a neighboring cell differently configure the time domain measurement resource limitation pattern indicating subframes to be measured will be described.

Figure 22:
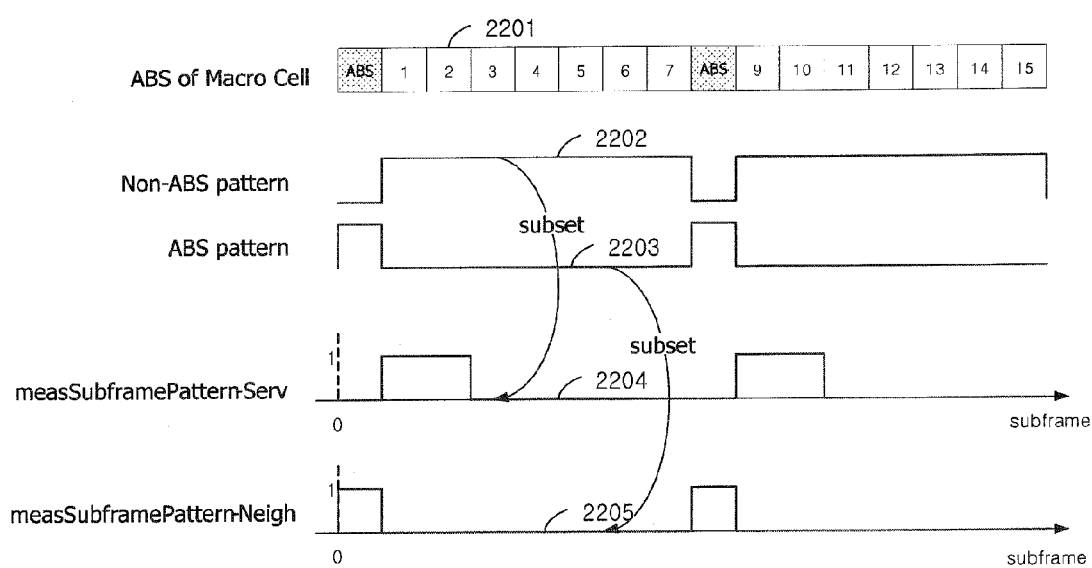
FIG. 22 illustrates an example in which subframes for cell measurement are differently configured under a situation in which a macro cell and pico/femto cells coexist.

FIG. 22 illustrates an example in which subframes for cell measurement are differently configured under a situation in which the macro cell and pico/femto cells coexist.

In FIG. 22, when the macro cell 220 is a serving cell, the macro cell 220 and the pico cell 300 differently configure subframes for measurement.

Specifically, the macro cell 220 configures zeroth and eighth subframes among subframes 2201 as ABSs. In this case, a pattern representing a general subframe other than the ABS, i.e., a non-ABS pattern 2202 may be represented as 0111111101111111. In addition, a pattern representing the subframe configured as the ABS, i.e., an ABS pattern 2203 may be represented as 1000000010000000.

In this case, like the macro cell 220, the pico cell 300 that is a neighboring cell may configure subframes as ABSs. However, the macro cell 220 and the pico cell 300 necessarily configure different time domain measurement resource restriction patterns indicating subframes to be measured.

That is, the time domain measurement resource restriction pattern (i.e., the measSubframePattern-Serv) applied in performing measurement on the macro cell 220 that is the serving cell is a subset of the non-ABS pattern 2202, and may be configured as 0110000001100000.

The time domain measurement resource restriction pattern (i.e., the measSubframePattern-Neigh) applied in performing measurement on the pico cell 300 that is the neighboring cell is a subset of the ABS pattern 2203, and may be configured as 1000000010000000.

As such, the macro cell 220 and the pico cell 300 differently configure the time domain measurement resource restriction patterns indicating the subframes to be measured, thereby solving the aforementioned problem.

Figure 23:
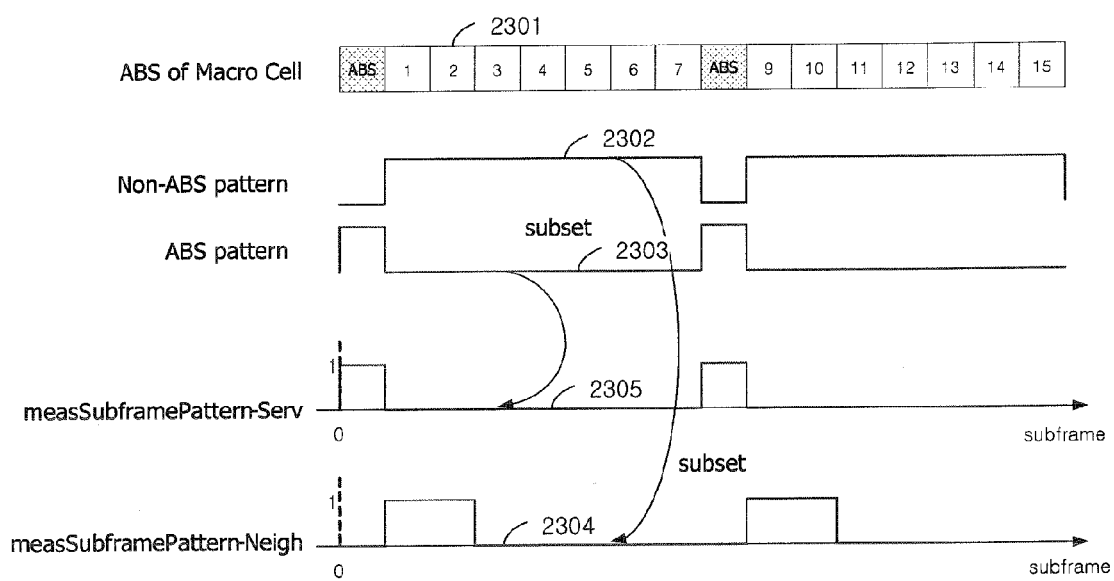
FIG. 23 illustrates another example in which the subframes for cell measurement are configured differently in the situation in which the macro cell and the pico/femto cells coexist.

FIG. 23 illustrates another example in which the subframes for cell measurement are configured differently in the situation in which the macro cell and the pico/femto cells coexist.

In FIG. 23, when the pico cell 300 is a serving cell, the macro cell 220 and the pico cell 300 differently configure subframes for measurement.

Specifically, the macro cell 220 that is a neighboring cell configures zeroth and eighth subframes among subframes 2301 as ABSs. In this case, a pattern representing a general subframe other than the ABS, i.e., a non-ABS pattern 2302 may be represented as 0111111101111111. In addition, a pattern representing the subframe configured as the ABS, i.e., an ABS pattern 2303 may be represented as 1000000010000000.

In this case, like the macro cell 220 that is the neighboring cell, the pico cell 300 that is the serving cell may configure subframes as ABSs. However, the macro cell 220 and the pico cell 300 necessarily configure different time domain measurement resource restriction patterns indicating subframes to be measured.

That is, the time domain measurement resource restriction pattern (i.e., the measSubframePattern-Serv) applied in performing measurement on the pico cell 300 that is the serving cell is a subset of the ABS pattern 2303, and may be configured as 1000000010000000.

The time domain measurement resource restriction pattern (i.e., the measSubframePattern-Neigh) applied in performing measurement on the macro cell 220 that is the neighboring cell is a subset of the non-ABS pattern 2302, and may be configured as 0110000001100000.

According to the method of the present invention shown in FIGS. 22 and 23, when the macro cell 220 is a serving cell or neighboring cell, the pattern for the RSRP/RSRQ measurement of the macro cell 220 is limited to the subset of a subframe except the ABS subframe of the macro cell 220. On the other hand, the pattern for the RSRP/RSRQ measurement of the pico cell 300 is identical to the ABS subframe of the macro cell 220 or is limited to the subset of a subframe except the ABS subframe of the macro cell 220.

As such, the macro cell 220 and the pico cell 300 differently configure the time domain measurement resource restriction patterns indicating the subframes to be measured, thereby solving the aforementioned problem.

Particularly, the absolute accuracy obtained by measuring RSRQs using parameters shown in the following Table 11 under a non-MBSFN situation in which CRSs do not collide with one another is shown in the following Table 11.

In the following Table 11, Cell 1 is a serving cell and Cell 2 is a target cell. The RSSI is used for RSRQ. The RSRQ is a cell indicated by the time domain measurement resource restriction pattern configured for the measured cell. In addition, RSSI is used for the RSRQ.

TABLE 11

| | | Test 1 | | Test 2 | | Test 3 | |
| --- | --- | --- | --- | --- | --- | --- | --- |
| Parameter | Unit | Cell 1 | Cell 2 | Cell 1 | Cell 2 | Cell 1 | Cell 2 |
| E-UTRA RF Channel Number | | 1 | | 1 | | 1 | |
| $BW_{Channel}$ | MHz | 10 | | 10 | | 10 | |
| Reference Signals | | $\mathrm{mod}(PCI_{cell1}, 3)$ $!= \mathrm{mod}(PCI_{cell2}, 3)$ | | $\mathrm{mod}(PCI_{cell1}, 3)$ $!= \mathrm{mod}(PCI_{cell2}, 3)$ | | $\mathrm{mod}(PCI_{cell1}, 3)$ $!= \mathrm{mod}(PCI_{cell2}, 3)$ | |
| Cell ABS pattern | | [11000000] | N/A | [11000000] | N/A | [11000000] | N/A |
| ABS pattern for serving cell measurement signaled to the UE in measSubframe Pattern-Serv-r10 | | [00110000] | | [00110000] | | [00110000] | |

TABLE 11-continued

| | | | Test 1 | | Test 2 | | Test 3 | |
|---|---|---|---|---|---|---|---|---|
| Parameter | | Unit | Cell 1 | Cell 2 | Cell 1 | Cell 2 | Cell 1 | Cell 2 |
| ABS pattern for neighbor cell measurement signaled to the UE in measSubframe Pattern-Neigh-r10 | | | [11000000] | | [11000000] | | [11000000] | |
| Measurement bandwidth | | $n_{PRB}$ | 22-7 | | 22-7 | | 22-7 | |
| PDSCH Reference measurement channel | | | R.0 FDD | — | R.0 FDD | — | R.0 FDD | — |
| PDSCH allocation | | $n_{PRB}$ | 13-6 | — | 13-6 | — | 13-6 | — |
| PDCCH/PCFICH/PHICH Reference measurement channel | | | R.6 FDD | | R.6 FDD | | R.6 FDD | |
| OCNG Patterns (OP.1 FDD) and A.3.2.1.2 (OP.2 FDD) | | | OP.1 FDD | OP.2 FDD | OP.1 FDD | OP.2 FDD | OP.1 FDD | OP.2 FDD |
| PBCH RA PBCH RB PSS RA SSS RA PCFICH RB PHICH RA PHICH RB PDCCH RA PDCCH RB PDSCH RA PDSCH RB OCNG RA OCNG RB | | dB | 0 | 0 | 0 | 0 | 0 | 0 |
| $N_{oc}$ | Bands 1, 4, 6, 10, 11, 18, 19, 21, 23 and 24 | dBm/15 kHz | [−84.76] | [−84.76] | [−103.85] | [−103.85] | [−116] | |
| | Bands 2, 5 and 7 | | | | | | [−114] | |
| | Band 25 | | | | | | [112.5] | |
| | Bands 3, 8, 12, 13, 14, 17 and 20 | | | | | | [−113] | |
| | Band 9 | | | | | | [−115] | |
| $Es/I_{ot}$ on Non-ABS subframe | | dB | [1.881] | [−7.46] | [1.881] | [−7.46] | [2.541] | [−9.46] |
| $Es/I_{ot}$ on ABS subframe | | dB | [1.881] | [−7.46] | [1.881] | [−7.46] | [2.541] | [−4] |
| RSRP | Bands 1, 4, 6, 10, 11, 18, 19, 21, 23 and 24 | dBm/15 kHz | [−80.76] | [−86.76] | [−99.85] | [−105.85] | [−112] | [−120] |
| | Bands 2, 5 and 7 | | | | | | [−110] | [−118] |
| | Band 25 | | | | | | [−108.5] | [−116.5] |
| | Bands 3, 8, 12, 13, 14, 17 and 20 | | | | | | [−109] | [−117] |
| | Band 9 | | | | | | [−111] | [−119] |
| RSRQ | Bands 1, 4, 6, 10, 11, 18, 19, 21, 23 and 24 | dB | [−12.96] | [−15.22] | [−12.96] | [−15.22] | [−12.71] | [−16.6] |
| | Bands 2, 5, 7 and 25 | | | | | | | |
| | Bands 3, 8, 12, 13, 14, 17 and 20 | | | | | | | |
| | Band 9 | | | | | | | |
| Io on Non-ABS subframe | Bands 1, 4, 6, 10, 11, 18, 19, 21, 23 and 24 | dBm/9 MHz | [−51] | [−51] | [−70] | [−70] | [−82.3] | |
| | Bands 2, 5 and 7 | | | | | | [−80.3] | |
| | Band 25 | | | | | | [−78.8] | |
| | Bands 3, 8, 12, 13, 14, 17 and 20 | | | | | | [−79.3] | |
| | Band 9 | | | | | | [−81.3] | |

TABLE 11-continued

| Parameter | | Unit | Test 1 Cell 1 | Test 1 Cell 2 | Test 2 Cell 1 | Test 2 Cell 2 | Test 3 Cell 1 | Test 3 Cell 2 |
|---|---|---|---|---|---|---|---|---|
| Io on ABS subframe | Bands 1, 4, 6, 10, 11, 18, 19, 21, 23 and 24 | dBm/ 9 MHz | [−53.86] | [−53.86] | [−72.95] | [−72.95] | [−85.6] | |
| | Bands 2, 5 and 7 | | | | | | [−83.6] | |
| | Band 25 | | | | | | [−82.1] | |
| | Bands 3, 8, 12, 13, 14, 17 and 20 | | | | | | [−82.6] | |
| | Band 9 | | | | | | [−84.6] | |
| $E_s/N_{oc}$ | | dB | [4] | [−2] | [4] | [−2] | [4] | [−4] |
| Propagation condition | | — | AWGN | | AWGN | | AWGN | |

In Table 11, the OCNG is used when cells are sufficiently allocated and the total transmission power spectral density for OFDM symbols is maintained constant. It was assumed that interference and noise sources from another cell not indicated in the test are constant with respect to subcarriers. The RSRQ, RSRP and Io level are induced from another parameter for another information. The minimum requirements of the RSRP and RSRQ are indicated under the assumption that the subcarriers have no relation with interference and noise in the antenna port of each receiver. It is assumed that PDSCH is not transmitted in the ABS subframe.

Meanwhile, the absolute accuracy obtained by measuring RSRQs using parameters shown in the following Table 12 under an MBSFN ABS situation is shown in the following Table 12.

TABLE 12

| Parameter | Unit | Test 1 Cell 1 | Test 1 Cell 2 | Test 2 Cell 1 | Test 2 Cell 2 | Test 3 Cell 1 | Test 3 Cell 2 |
|---|---|---|---|---|---|---|---|
| E-UTRA RF Channel Number | | 1 | | 1 | | 1 | |
| $BW_{Channel}$ | MHz | 10 | | 10 | | 10 | |
| Reference Signals | | mod($PCI_{cell1}$, 3) = mod($PCI_{cell2}$, 3) | | mod($PCI_{cell1}$, 3) = mod($PCI_{cell2}$, 3) | | mod($PCI_{cell1}$, 3) = mod($PCI_{cell2}$, 3) | |
| Cell ABS pattern | | [001000 010000 10000000] | N/A | [001000 010000 10000000] | N/A | [001000 010000 10000000] | N/A |
| ABS pattern for serving cell measurement signaled to the UE in measSubframe Pattern-Serv-r10 | | [01000010000100000000] | | [01000010000100000000] | | [01000010000100000000] | |
| ABS pattern for neighbor cell measurement signaled to the UE in measSubframe Pattern-Neigh-r10 | | [00100001000010000000] | | [00100001000010000000] | | [00100001000010000000] | |
| Measurement bandwidth | $n_{PRB}$ | 22-7 | | 22-7 | | 22-7 | |
| PDSCH Reference measurement channel | | R.0 FDD | — | R.0 FDD | — | R.0 FDD | — |
| PDSCH allocation | $n_{PRB}$ | 13-6 | — | 13-6 | — | 13-6 | — |
| PDCCH/PCFICH/ PHICH Reference measurement channel | | R.6 FDD | | R.6 FDD | | R.6 FDD | |
| OCNG Patterns (OP.1 FDD) and A.3.2.1.2 (OP.2 FDD) | | OP.1 FDD | OP.2 FDD | OP.1 FDD | OP.2 FDD | OP.1 FDD | OP.2 FDD |
| PBCH RA PBCH RB PSS RA SSS RA PCFICH RB PHICH RA PHICH RB PDCCH RA PDCCH RB PDSCH RA PDSCH RB OCNG RA OCNG RB | dB | 0 | 0 | 0 | 0 | 0 | 0 |
| $N_{oc}$ Bands 1, 4, 6, 10, 11, | dBm/ 15 kHz | [−84.76] | [−84.76] | [−103.85] | [−103.85] | [−116] | |

TABLE 12-continued

| Parameter | | Unit | Test 1 Cell 1 | Test 1 Cell 2 | Test 2 Cell 1 | Test 2 Cell 2 | Test 3 Cell 1 | Test 3 Cell 2 |
|---|---|---|---|---|---|---|---|---|
| | 18, 19, 21, 23 and 24 | | | | | | | |
| | Bands 2, 5 and 7 | | | | | | [−114] | |
| | Band 25 | | | | | | [112.5] | |
| | Bands 3, 8, 12, 13, 14, 17 and 20 | | | | | | [−113] | |
| | Band 9 | | | | | | [−115] | |
| $Es/I_{ot}$ on Non-ABS subframe | | dB | [1.881] | [−7.46] | [1.881] | [−7.46] | [2.541] | [−9.46] |
| $Es/I_{ot}$ on ABS subframe | | dB | [1.881] | [−2] | [1.881] | [−2] | [2.541] | [−4] |
| RSRP | Bands 1, 4, 6, 10, 11, 18, 19, 21, 23 and 24 | dBm/ 15 kHz | [−80.76] | [−86.76] | [−99.85] | [−105.85] | [−112] | [−120] |
| | Bands 2, 5 and 7 | | | | | | [−110] | [−118] |
| | Band 25 | | | | | | [−108.5] | [−116.5] |
| | Bands 3, 8, 12, 13, 14, 17 and 20 | | | | | | [−109] | [−117] |
| | Band 9 | | | | | | [−111] | [−119] |
| RSRQ | Bands 1, 4, 6, 10, 11, 18, 19, 21, 23 and 24 | dB | [−12.96] | [−15] | [−12.96] | [−15] | [−12.71] | [−16.34] |
| | Bands 2, 5, 7 and 25 | | | | | | | |
| | Bands 3, 8, 12, 13, 14, 17 and 20 | | | | | | | |
| | Band 9 | | | | | | | |
| Io on Non-ABS subframe | Bands 1, 4, 6, 10, 11, 18, 19, 21, 23 and 24 | dBm/ 9 MHz | [−51] | [−51] | [−70] | [−70] | [−82.3] | |
| | Bands 2, 5 and 7 | | | | | | [−80.3] | |
| | Band 25 | | | | | | [−78.8] | |
| | Bands 3, 8, 12, 13, 14, 17 and 20 | | | | | | [−79.3] | |
| | Band 9 | | | | | | [−81.3] | |
| Io on ABS subframe | Bands 1, 4, 6, 10, 11, 18, 19, 21, 23 and 24 | dBm/ 9 MHz | [−53.86] | [−53.86] | [−72.95] | [−72.95] | [−85.6] | |
| | Bands 2, 5 and 7 | | | | | | [−83.6] | |
| | Band 25 | | | | | | [−82.1] | |
| | Bands 3, 8, 12, 13, 14, 17 and 20 | | | | | | [−82.6] | |
| | Band 9 | | | | | | [−84.6] | |
| $Es/N_{oc}$ | | dB | [4] | [−2] | [4] | [−2] | [4] | [−4] |
| Propagation condition | | — | AWGN | | AWGN | | AWGN | |
| Time offset between cells | | ms | [2] | | [2] | | [2] | |

The exemplary embodiments described above may be implemented using various means. For example, the exemplary embodiments may be implemented by hardware, firmware, software, or combination thereof.

According to the implementation using the hardware, the method according to the exemplary embodiments may be implemented using at least one of application specific integrated circuits (ASICs), digital signal processors (DSPs), digital signal processing devices (DSPDs), programmable logic devices (PLDs), field programmable gate arrays (FPGAs), processors, controllers, etc.

According to the implementation using the firmware or software, the method according to the exemplary embodiments may be implemented in the form of a module, procedure or function performing functions and operations described above. Software codes may be stored in a memory unit and executed by a processor. The memory unit may be located in the inside or outside of the processor, and communicate data with the processor using various means known in the art.

Figure 24:
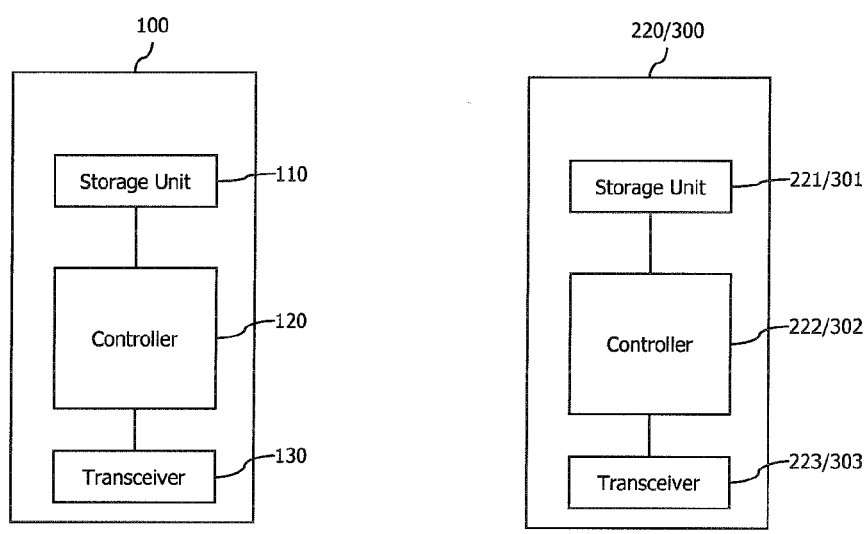
FIG. 24 is a configuration block diagram illustrating a UE and a base station (BS) according to an exemplary embodiment.

FIG. 24 is a configuration block diagram illustrating the UE 100 and the BS 220/300 according to an exemplary embodiment.

As shown in FIG. 24, the UE 100 includes a storage means 110, a controller 120 and a transceiver 130. The BS 220/300 is a macro BS or pico/femto BS, and includes a storage means 221/301, a controller 222/302 and a transceiver 223/303.

The storage means 110 or 221/301 stores the methods shown in FIGS. 10 to 23. The transceiver 130 or 223/303 transmits/receive the aforementioned signals.

The controller 120 or 222/302 controls the storage means and the transceiver. Specifically, each of the controllers performs the methods stored in the storage means.

According to the exemplary embodiments, it is possible to increase the accuracy in measuring the RSRP and RSRQ and to reduce measurement time.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method of providing information for cell measurement, the method comprising:
configuring a subframe for performing a first measurement with respect to a first cell, wherein a first position performing the first measurement is different from a second position performing a second measurement with respect to a second cell; and
transmitting, from the first cell to a user equipment (UE), first pattern information indicating the first position and second pattern information indicating the second position,
wherein the first and second pattern information indicate the first position and the second position as a bit '1', respectively,
wherein the first and second pattern information indicate at least one subframe per a radio frame, used for performing the measurements, and
wherein a first subframe corresponding to the first pattern information is included in non-ABS (Almost Blank Subframe) subframes of the first cell, and a second subframe corresponding to the second pattern information is included in ABS subframes of the first cell.

2. The method of claim 1, wherein the first or second pattern information is represented as a bit stream, and a first bit of the bit stream corresponds to a zeroth subframe of a frame satisfying single frequency network (SFN) mod x=0, and
wherein the x denotes a size obtained by dividing 10 into the bit stream, and the SFN denotes a system frame number.

3. The method of claim 1, wherein the first or second pattern information is a time domain measurement resource restriction pattern or measSubframePattern.

4. The method of claim 1, wherein the first pattern information is measSubframePattern-Serv, and the second pattern information is measSubframePattern-Neigh.

5. The method of claim 1, wherein the second pattern information is received through X2 interface-based signaling.

6. The method of claim 1, wherein the first and second pattern information is transmitted through a radio resource control (RRC) message.

7. The method of claim 6, wherein the RRC message is an RRC connection reconfiguration message.

8. The method of claim 1, wherein the first measurement and the second measurement include measuring at least one of a reference signal received power (RSRP) and a reference signal received quality (RSRQ) using a cell-specific reference signal (CRS).

9. A method of performing measurements in a UE placed within a coverage of a serving cell and a coverage of a neighboring cell, the method comprising:
transceiving signals; and
performing measurements on the serving cell and the neighboring cell on different positions in a subframe according to first pattern information and second pattern information, respectively,
wherein the first pattern information and the second pattern information indicate the different positions for the measurements as a bit '1', respectively,
wherein the first pattern information and the second pattern information indicate at least one subframe per a radio frame, used for performing the measurements, and
wherein a first subframe corresponding to the first pattern information is included in non-ABS (Almost Blank Subframe) subframes of the first cell, and a second subframe corresponding to the second pattern information is included in ABS subframes of the first cell.

10. The method of claim 9, wherein the first or second pattern information is represented as a bit stream, and a first bit of the bit stream corresponds to a zeroth subframe of a frame satisfying single frequency network (SFN) mod x=0, and
wherein the x denotes a size obtained by dividing 10 into the bit stream, and the SFN denotes a system frame number.

11. The method of claim 9, wherein the first or second pattern information is a time domain measurement resource restriction pattern or measSubframePattern.

12. The method of claim 9, wherein the first pattern information is measSubframePattern-Neigh, or the second pattern information is measSubframePattern-Serv.

13. The method of claim 9, wherein the measurements include measuring at least one of a reference signal received power (RSRP) and a reference signal received quality (RSRQ) using a cell-specific reference signal (CRS).

14. A base station comprising:
a transceiver to transceive signals; and
a controller configured to:
configure a subframe for performing a first measurement with respect to the base station, wherein a first position performing the first measurement is different from a second position performing a second measurement with respect to a neighboring cell; and
transmit first pattern information indicating the first position and second pattern information indicating the second position,
wherein the first and second pattern information indicate the first position and the second position as a bit '1', respectively, wherein the first and second pattern information indicate at least one subframe per a radio frame, used for performing the measurements, and wherein a first subframe corresponding to the first pattern information is included in non-ABS (Almost Blank Subframe) subframes of the first cell, and a second subframe corresponding to the second pattern information is included in ABS subframes of the first cell.

15. The base station of claim 14, wherein the first pattern information is measSubframePattern-Serv, or the second pattern information is measSubframePattern-Neigh.

16. The base station of claim 14, wherein the first or second pattern information is represented as a bit stream, and a first bit of the bit stream corresponds to a zeroth subframe of a frame satisfying SFN mod x=0, and wherein the x denotes a size obtained by dividing 10 into the bit stream, and the SFN denotes a system frame number.

17. The base station of claim 14, wherein the first or second pattern information is a time domain measurement resource restriction pattern or measSubframePattern.

18. The base station of claim 14, wherein the second pattern information is received through X2 interface-based signaling.

19. The base station of claim 14, wherein the transmitter transmits the first pattern information through a radio resource control (RRC) message.

20. The base station of claim 19, wherein the RRC message is an RRC connection reconfiguration message.

21. A terminal comprising:
a transceiver to transceive signals; and
a controller configured to:

perform a first measurement with respect to a serving cell and a second measurement with respect to a neighboring cell on different positions in a subframe according to first pattern information and second pattern information, respectively, when the terminal is located within a coverage of the serving cell and a coverage of the neighboring cell, wherein the first pattern information and the second pattern information indicate the different positions for the measurements as a bit '1', respectively, wherein the first pattern information and the second pattern information indicate at least one subframe per radio frame, used for performing the measurements, and wherein a first subframe corresponding to the first pattern information is included in non-ABS (Almost Blank Subframe) subframes of the first cell, and a second subframe corresponding to the second pattern information is included in ABS subframes of the first cell.

22. The user terminal of claim 21, wherein the pattern information is a time domain measurement resource restriction pattern or measSubframePattern.

23. The user terminal of claim 21, wherein the first pattern information is measSubframePattern-Neigh, or the second pattern information is measSubframePattern-Serv.

24. The user terminal of claim 21, wherein the controller measures at least one of a reference signal received power (RSRP) and a reference signal received quality (RSRQ) using a cell-specific reference signal (CRS).

* * * * *